United States Patent [19]
Fletcher

[11] Patent Number: 5,487,101
[45] Date of Patent: Jan. 23, 1996

[54] OFF-LOAD CELLULAR SYSTEM FOR OFF-LOADING CELLULAR SERVICE FROM A MAIN CELLULAR SYSTEM TO INCREASE CELLULAR SERVICE CAPACITY

[75] Inventor: Anthony G. Fletcher, Corinth, Miss.

[73] Assignee: Celcore, Inc., Memphis, Tenn.

[21] Appl. No.: 37,170

[22] Filed: Mar. 26, 1993

[51] Int. Cl.⁶ .............................. H04Q 7/36; H04Q 7/38
[52] U.S. Cl. .................. 379/60; 379/59; 455/15; 455/33.2; 455/33.4
[58] Field of Search ............... 379/59, 60; 455/11.1, 455/13.1, 33.1, 33.2, 33.4, 34.1, 15, 16, 17

[56] References Cited

U.S. PATENT DOCUMENTS

| | | | |
|---|---|---|---|
| 4,144,409 | 3/1979 | Utano et al. | |
| 4,144,411 | 3/1979 | Frenkiel . | |
| 4,144,496 | 3/1979 | Cunningham et al. . | |
| 4,156,873 | 5/1979 | Moore | 325/53 |
| 4,485,486 | 11/1984 | Webb et al. | 343/6.8 |
| 4,658,096 | 4/1987 | West, Jr. et al. | 455/33 |
| 4,704,734 | 11/1987 | Menich et al. | 379/59 |
| 4,727,590 | 2/1988 | Kawano et al. | 455/33 |
| 4,737,978 | 4/1988 | Burke et al. | 455/33 |
| 4,748,682 | 5/1988 | Fukae et al. | 379/60 |
| 4,759,051 | 7/1988 | Han | 455/137 |
| 4,771,448 | 9/1988 | Koohgoli et al. | 379/60 |
| 4,775,998 | 10/1988 | Felix | 379/60 |
| 4,790,000 | 12/1988 | Kinoshita | 379/59 |
| 4,794,635 | 12/1988 | Hess | 379/59 |
| 4,797,947 | 1/1989 | Labedz | 455/33 |
| 4,799,253 | 1/1989 | Stern et al. | 379/59 |
| 4,850,037 | 7/1989 | Bochmann | 379/59 |
| 4,881,082 | 11/1989 | Graziano | 455/276 |
| 4,901,340 | 2/1990 | Parker et al. | 342/432 |
| 4,939,791 | 7/1990 | Bochmann et al. | 379/60 |
| 4,999,835 | 3/1991 | Lagoutte | 370/94.1 |
| 5,067,147 | 11/1991 | Lee | 379/60 |
| 5,067,173 | 11/1991 | Gordon et al. | 359/152 |
| 5,095,529 | 3/1992 | Comroe et al. | 455/16 |
| 5,208,847 | 5/1993 | Allen | 379/59 |
| 5,235,632 | 8/1993 | Raith | 455/33.1 |
| 5,251,249 | 10/1993 | Allen et al. | 379/59 |
| 5,279,720 | 1/1993 | Grube et al. | 379/59 |
| 5,357,559 | 10/1994 | Kallin et al. | 455/33.4 |

FOREIGN PATENT DOCUMENTS

| | | |
|---|---|---|
| 0391597 | 10/1990 | European Pat. Off. . |
| 2234649 | 2/1991 | United Kingdom . |

OTHER PUBLICATIONS

World Publication, WO91/07919, 16 May 1991.
World Publication, WO91/19403, 23 Dec. 1991.
World Publication, WO92/02104, 6 Feb. 1992.

Primary Examiner—Dwayne D. Bost
Attorney, Agent, or Firm—Kenyon & Kenyon

[57] ABSTRACT

An off-load cellular system controls cellular service between a main cellular system and the off-load cellular system and provides off-load cellular service to a mobile telephone. The off-load cellular system includes a receiver circuit, monitoring and receiving an origination message broadcast from the mobile telephone located in the off-load cellular system, and a system controller, for receiving the origination message output from the receiver circuit, and for outputting a connect signal indicating whether the off-load cellular service is to be provided to the mobile telephone responsive to the origination message. In addition, the off-load cellular system includes a connection controller for receiving the connect signal output from the system controller, for transmitting to the mobile telephone a voice connect message indicating a frequency to obtain the off-load cellular service responsive to the connect signal, and for connecting the mobile telephone with a calling party, providing the off-load cellular service to the mobile telephone.

11 Claims, 17 Drawing Sheets

OFF-LOAD CELLULAR SYSTEM FOR OFF-LOADING CELLULAR SERVICE FROM A MAIN CELLULAR SYSTEM TO INCREASE CELLULAR SERVICE CAPACITY

CROSS-REFERENCE TO RELATED APPLICATION

This application is related to application Ser. No. 08/037,831 filed Mar. 26, 1993 and assigned to the common Assignee herein, now abandoned.

BACKGROUND OF THE INVENTION

1. Field of the Invention

The present invention generally relates to a cellular communication system used to off-load telephone calls from a main cellular system, and, more particularly, to a cellular system providing telephone service for a mobile telephone in a cell which is located in an area geographically inside a larger cell of a main cellular system requiring a high concentration of cellular service.

2. Description of the Related Art

Cellular mobile telephones (mobile telephones) are typically employed in automobiles, ships or the like, and thus, are transportable with the user into various different geographic zones. In each of the different geographic zones, one or more mobile telephone switching offices (MTSO) are provided to complete call connections. Once connected to the mobile telephone switching office, the mobile telephone may then be connected to another mobile telephone within a specific zone or, through land-based networks such as a public switching telephone network (PSTN), to a land-based telephone or to another cellular mobile telephone in a different zone.

Cellular mobile telephone systems (cellular systems) service specific geographic areas, or zones, each of which is typically divided into a plurality of cells. Each cell includes a stationary transmitter receiver (transceiver) station coupled to transmit and receive antennas, which is used to establish radio communication connections with mobile telephones physically located within the associated cell. The stationary transmitter receiver stations, in turn, are connected to a mobile telephone switching office, associated with the zone where the stationary transmitter receiver stations are located, which switches the call in an appropriate manner. Each cell within a specific zone has a number of frequencies assigned to it to establish radio communications with a mobile telephone. The frequencies are divided into control channels, paging channels and voice channels. The paging and control channels are used for the mutual identification between the mobile telephone and the cellular system providing the cellular mobile telephone service. The location or frequency of the control channels contained in the frequency range assigned to each cell identifies the type of cellular system which is being used. Typically, one set or range of frequencies is called an "A" cellular system and a second set of frequencies is called a "B" cellular system. Generally, a specific geographic area contains one of each type of cellular system (i.e., an A and a B cellular system) thereby to provide alternative cellular service to that area.

A mobile telephone must identify itself to the cellular system provider before service for the mobile telephone is established. The identification process begins using the control channels. When first switched on, the mobile telephone scans through the control channels and measures the signal strength of each channel. It will then tune to the strongest control channel and lock on to the overhead message stream. When the mobile makes an access attempt, the reverse setup channel access message contains various data which permits the cellular system to identify the mobile telephone and thereby determine whether the mobile telephone should be provided with cellular service. A detailed description of the interface between the mobile telephone and the land-based transceiver station may be found in the Federal Register, Vol. 46, No. 98, Thursday, May 21, 1981—app. D, pages 27680–27706.

In a typical cellular telephone system, as a mobile unit travels along a path that passes from one cell to another, a handoff occurs. The handoff action is controlled by the mobile telephone switching office which monitors the signal strength received from the mobile telephone. The handoff command is typically generated when the signal received from the mobile telephone falls below a preselected signal strength, thus indicating that the mobile telephone is at the cell boundary of one cell and requires a transfer of the cellular service to an adjacent cell which is able to receive a signal from the mobile above the preselected signal strength.

As a mobile telephone passes from one cell to another cell, the handoff command instructs the new cell which the mobile telephone is entering, to begin transmitting at a frequency which is different from the frequency which was transmitted by the cell from which the mobile telephone is exiting. This procedure is followed as the mobile telephone passes into each next successive, adjacent cell. The assigned frequencies of each adjacent cell are different, and such assigned frequencies are not repeated except for cells that are far enough away from each other so that no interference problems will occur.

One example of a stationary transmitter receiver station, also referred to as a cell site, is the AT&T series I and II cell sites (model 1 and model 2 architecture) used in the family of AUTOPLEX™ cellular telecommunications systems which are commercially available from the American Telephone and Telegraph Company of New York, N.Y.

Because of increased demands for more radio channels or frequencies resulting from an increased number of cellular customers, cellular system providers often desire to expand their networks to serve an increasing number of customers within a geographic location.

Various solutions have been proposed to increase the capacity of cellular systems and thereby to meet the foregoing need. For example, a cell may be split into four smaller cells, each with a radius of half the radius of the original cell permitting cellular service to be increased four fold. Naturally, the smaller the cell, the greater the number of handoffs are required in a cellular telephone system for a given capacity. These smaller cell sites are typically known as microcell sites which operate functionally, similarly to a traditional macrocellular or main cellular system but only provide cellular service for a small geographic area. The microcell sites are typically directly connected to the main cell site using coaxial transmission lines, microwave links or an optical fiber cable network which interconnects the main cell site with associated microcell sites using a nonstandard protocol. See, for example, U.S. Pat. No. 5,067,173 citing additional references.

While cells may be subdivided into smaller cells to provide cellular service for an increasing number of customers, shrinking cell cites creates additional considerations and problems. For example, the rate at which mobile telephones move through the cell and the non-uniformity of the electromagnetic field generated in the cell affect the performance of a microcell system. Both factors relate to the time required to determine the relative location of the mobile telephone and to process a handoff for the mobile telephone from the stationary transmitter receiver station of one cell where the mobile telephone is currently located but is preparing to exit, to the stationary transmitter receiver station of another cell, where the mobile telephone is entering. If a handoff is required, one or more candidate cells must be queried for their idle channel status and for a verification of the mobile telephone's signal strength in that candidate cell. The processing of the decision, status, and verification usually requires the intervention of higher level system control functions in addition to the control function in the serving and candidate cells. In addition, the mobile telephone must be instructed to tune to a frequency available in the candidate cell and verification of its presence after the handoff must be made by the candidate cell. Thus, a significant amount of time is used for handoff processing.

In addition, since microcell systems are usually directly connected to a main cellular system via a nonstandard protocol, it is impossible to integrate or include a generic microcell system to off-load cellular service from the main cellular system since microcell systems are manufactured with a proprietary nonstandard protocol. This inability of competing products to provide cellular service results in microcellular systems being expensive and difficult to integrate with other cellular systems.

Thus, it is desirable to provide for easily and inexpensively off-loading cellular service from a main cellular system using a microcellular system. Specifically, it is desirable to enable establishing a microcellular system in a small area, requiring a high concentration of cellular service, of a main cellular system to thereby off-load a significant number of customers from the main cellular system. For example, a large office building or shopping mall may require a significant amount of cellular service which could be easily provided using a microcellular system since mobile telephone users typically establish cellular service while walking from office to office in a building or from store to store in a shopping mall. Thus, mobile telephones in these small areas are less likely to rapidly move across large geographic areas, making use of a microcellular system ideal.

In addition, there is currently no method of off-loading cellular service from a main cellular system to another or off-load cellular system without reconfiguring the main cellular system to ignore the cellular service in the off-load cellular system which is providing cellular service in the same area where the main cellular system had previously provided the cellular service. It is, therefore, also desirable to provide this additional or off-load cellular service for customers in a high concentration area of the main cellular system without reconfiguring the main cellular system, thereby providing off-load cellular service which is transparent to the main cellular system.

Further, it is desirable to off-load cellular service from a main cellular system using, for example, an off-load or microcellular system to provide cellular service in an area of high concentration without requiring the microcellular system to interface with the mobile telephone switching office (MTSO). The reason that it is undesirable for the off-load cellular system to be required to interface with the mobile telephone switching office is that no standard interface has been developed which allows the off-load cellular system to be easily integrated with the mobile telephone switching office without the off-load cellular system being required to implement the specific interface requirements of the mobile telephone switching office. Since various vendors provide mobile telephone switching offices for cellular service using different interface protocols, the off-load cellular system would be required to know the interface protocol used by each cellular system. Thus, the off-load cellular system would be complex and not easily integratable into an already existing cellular system.

Finally, it is desirable that a mobile telephone, which is being serviced by the off-load cellular system be able to establish telephone service with telephone equipment which is located outside the off-load cellular system. Thus, even though the off-load cellular system is transparent to the main cellular system, the off-load cellular system must still be able to provide telephone service with telephone equipment located outside the serving area of the off-load cellular system.

SUMMARY OF THE INVENTION

It is, therefore, an object of the invention to provide an off-load cellular system within an existing main cellular system for off-loading calls in areas of high concentration from the main cellular system while operating transparently to the main cellular system.

It is another object of the invention to provide an off-load cellular system which permits the mobile telephone within the off-load cellular system to establish telephone connection with telephone equipment located outside of the off-load cellular system.

It is another object of the invention to provide an off-load cellular system which is not required to interface with the mobile telephone switching office of the main cellular system thereby eliminating the use of a nonstandard protocol interface.

These and other objects of the present invention are realized by providing a page rebroadcast system in an off-load cellular system, including a receiver circuit monitoring and receiving a page signal broadcast from a main cellular system. In addition, the page rebroadcast systems also includes a rebroadcast unit receiving the page signal output from the receiver circuit, and rebroadcasting the page signal as a rebroadcasted signal, enabling a mobile telephone located in the off-load cellular system to receive the page signal from the main cellular system.

The present invention also provides a control system controlling cellular service between a main cellular system and an off-load cellular system. The control system includes a receiver circuit monitoring and receiving an origination message broadcast from a mobile telephone located in an off-load cellular system. In addition, the control system includes a controller receiving the origination message output from the receiver circuit, and instructing the off-load cellular system whether to provide off-load cellular service to the mobile telephone responsive to the origination message.

Finally, the present invention provides an off-load cellular system for controlling cellular service between a main cellular system and the off-load cellular system and for providing off-load cellular service to a mobile telephone. The off-load cellular system includes a receiver circuit, monitoring and receiving an origination message broadcast from the mobile telephone located in the off-load cellular system, and a system controller, for receiving the origination message output from the receiver circuit, and for outputting a connect signal indicating whether the off-load cellular service is to be provided to the mobile telephone responsive to the origination message. In addition, the off-load cellular system includes a connection controller for receiving the connect signal output from the system controller, for transmitting to the mobile telephone a voice connect message indicating a frequency to obtain the off-load cellular service responsive to the connect signal, and for connecting the mobile telephone with a calling party, providing the off-load cellular service to the mobile telephone.

The present invention uses a combination of nearby forward setup channel monitoring, rebroadcast of monitored mobile pages, and selected shedding of mobile access attempts to provide an off-load cellular system which can operate within an existing cellular system transparently without requiring nonstandard protocol interfacing with different mobile telephone switching offices. The invention allows the use of a standard mobile telephone in the off-load cellular system as well. Thus, no new equipment is needed by the mobile telephone user.

The off-load cellular system may be a stand alone custom application used in office buildings, hospitals, shopping malls, etc., or the off-load cellular system may be a cellular system which provides selective service to customers of the main cellular system to off-load cellular service which has been previously provided by the main cellular system. The present invention also provides the intersystem functions of customer verification, call delivery and handoff using either existing cellular clearing house services, the EIA/TIA IS-41 interface specifications or a combination of the two. Flexible registration criterion is used to limit the mobile telephone's ability to register with the off-load cellular system when the mobile telephone is considered an unsuitable user for the off-load cellular service.

These, together with other objects and advantages which will subsequently become apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
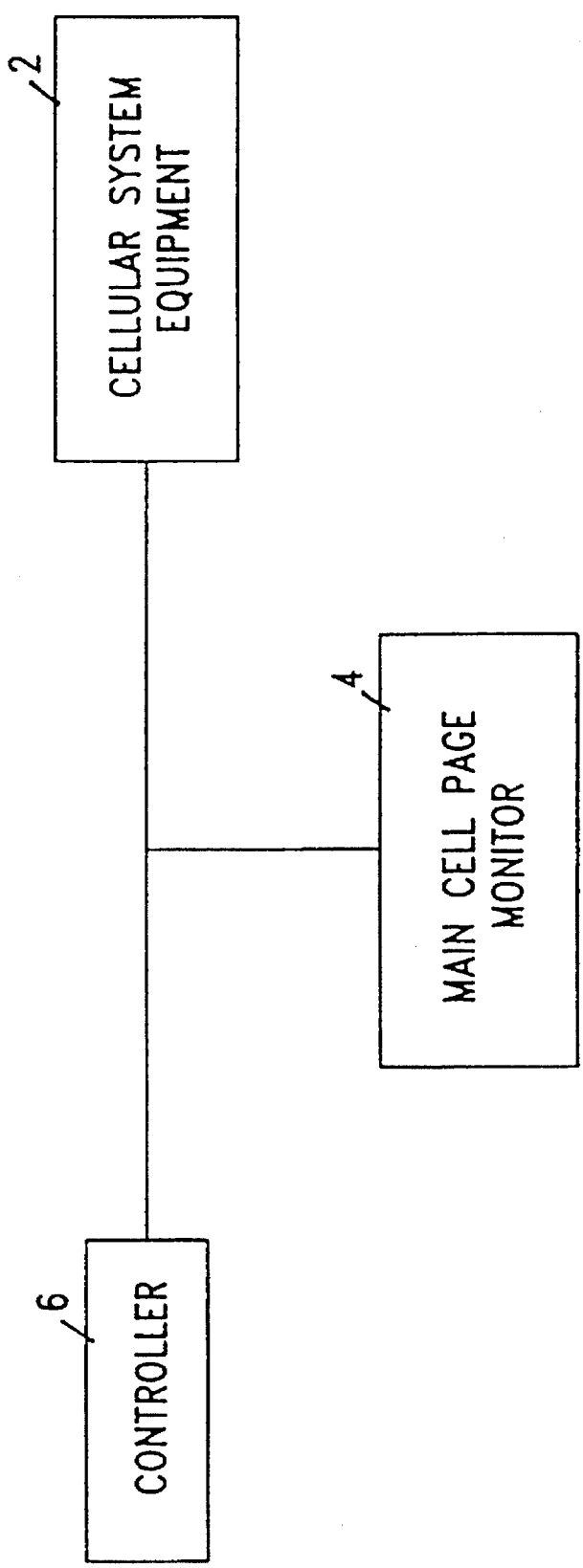
FIG. 1 is a basic illustration of the conceptual construction of the present invention.

FIG. 1 illustrates the conceptual construction of the off-load cellular system of the present invention. In FIG. 1, cellular system equipment 2 is constructed of conventional cellular equipment which can be purchased from AT&T, for example, and is used to establish cellular service with a mobile telephone by connecting a mobile telephone to, for example, a public switching telephone network. A main cell page monitor 4 monitors the overhead control channels to determine whether the main cellular system has transmitted a page message to a mobile telephone which may be located in the off-load cellular system. If the main cell page monitor 4 receives a page message from the main cellular system, the main cell page monitor 4 notifies the controller 6 that a page message has been received and transmits the page message to the controller 6. The controller 6 formats the page message to be accepted by cellular system equipment 2 for rebroadcasting within the off-load cellular system. This rebroadcasting of the page message permits a mobile telephone to receive a page message from the main cellular system even while located within the off-load cellular system. Rebroadcasting the page message is necessary since standard mobile telephones will naturally tune to the frequency or channel having the highest signal strength within a cellular service system or provider. Thus, with this configuration, a mobile telephone located within an off-load cellular system will be able to receive page messages from the main cellular system to permit the main cellular system to access the mobile telephone while the off-load cellular system appears transparent to the main cellular system.

In addition to the rebroadcasting of the page message to permit the mobile telephone to receive pages from the main cellular system, controller 6 may also be used to determine whether a mobile telephone which is located in the off-load cellular system should be serviced by the off-load cellular system or whether the mobile telephone should be selectively shed from the off-load cellular system to receive cellular service from the main cellular system. The mobile telephone's access attempt is shed by broadcasting a message instructing the mobile telephone to tune to the main cellular system. As will be discussed, the message preferably conforms to EIA-553 interface specifications and includes a directed retry message as discussed in these specifications.

Figure 2:
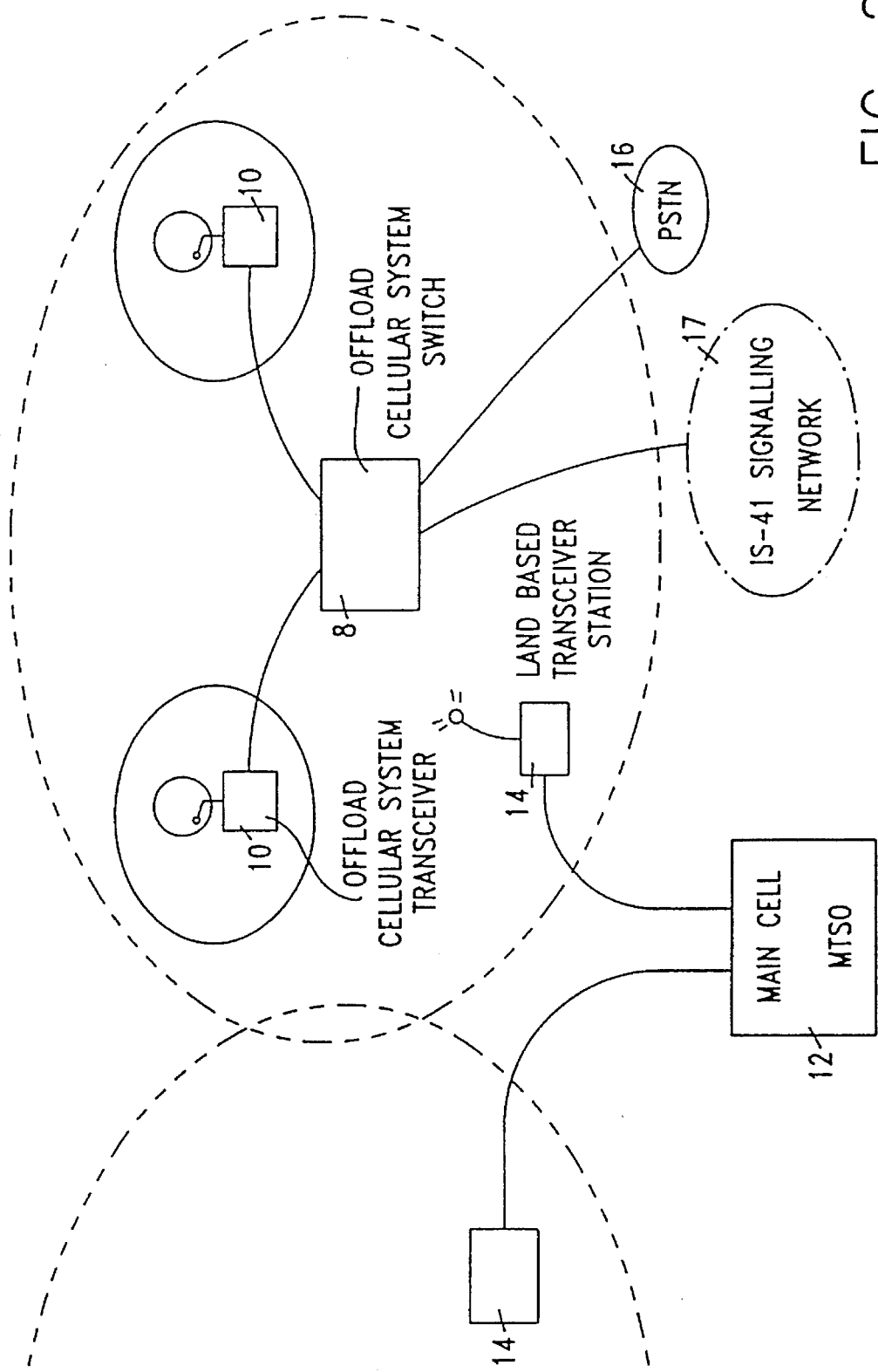
FIG. 2 is an illustration of the interaction between the cellular system of the present invention of a main cellular system according to the first embodiment of the invention.

FIG. 2 illustrates the basic interconnections between the off-load cellular system with a main cellular system including an IS-41 signalling network. In FIG. 2, the off-load cellular system includes the off-load cellular system switch 8 and the off-load cellular system transceiver 10. The off-load cellular system switch 8 may be connected to multiple off-load cellular system transceivers 10 for transmitting a call to and receiving a call from mobile telephones located within the off-load cellular system. In FIG. 2, the off-load cellular system switch 8 is connected to a public switching telephone network (PSTN) 16 for connecting a mobile telephone with telephone equipment connected to the public switching telephone network 16 via, for example, a central switching box or a private branch exchange. The mobile telephone switching office 12 of the main cellular system may also connect to the public switching telephone network 16 or another public switching telephone network in order also to provide telephone service between a mobile telephone in the main cellular system with telephone equipment connected to a public switching telephone network. The mobile telephone switching office 12 is also connected to multiple land-based transceiver stations 14 which are used to transmit control and voice data to a mobile telephone located in the main cellular system. Further, the off-load cellular system may be connected to the main cellular system for purposes of delivering a cellular call from the main cellular system to the off-load cellular system. As shown in FIG. 2, off-load cellular system switch 8 is connected to main cell mobile telephone switching office 12 via an IS-41 signalling network 17.

Figure 3A:
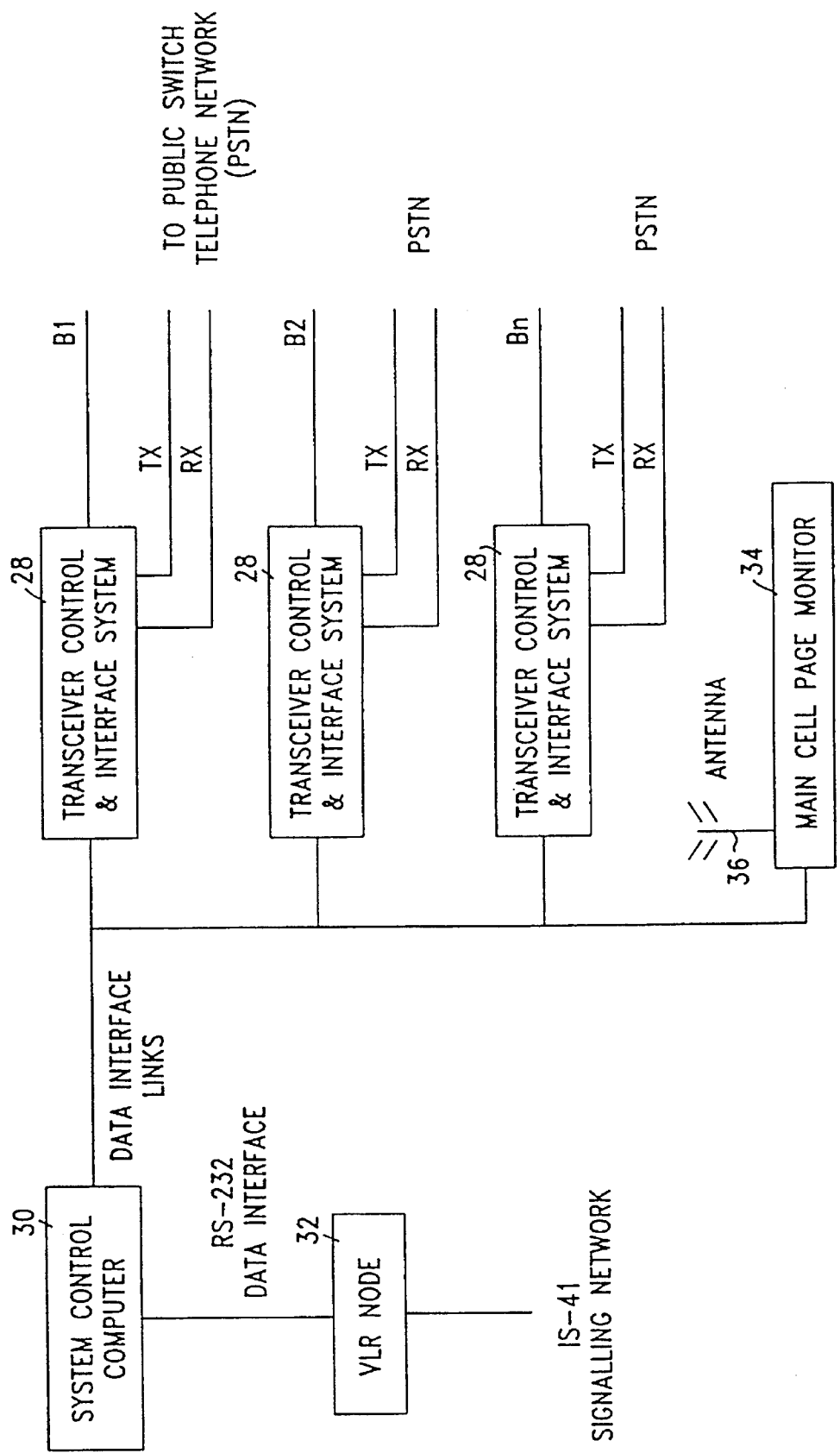
FIGS. 3A–3B together comprise a block diagram of the circuit construction of the present invention according to the first embodiment.
Figure 3B:
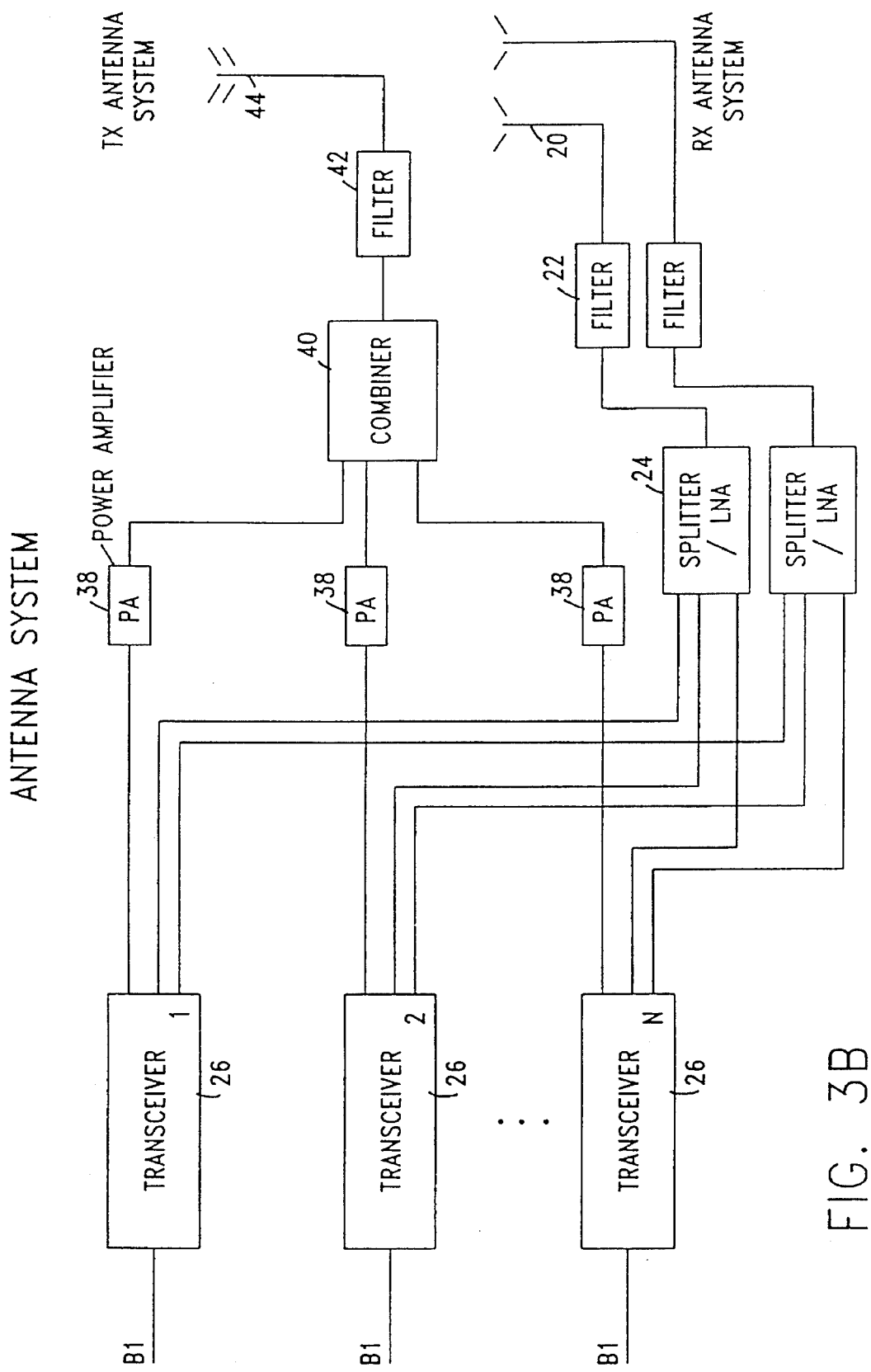

FIGS. 3A and 3B together comprise a block diagram of the present invention according to the first embodiment. In FIGS. 3A and 3B, receive antenna system 20 is used to receive signal transmissions from the mobile telephone. The receive antenna 20 may, for example, simply be a leaky coaxial cable connected to a 3-DB mobile antenna mounted in various floors of an office building. Once the receive antenna system 20 has received a signal from the mobile telephone, the signal is transmitted to conventional filter 22 via, for example, a coaxial cable which may be connected to filter 22 using an N-type connecter. Filter 22 is preferably a band pass filter which limits the band width of the receive signal of receive antenna system 20. Filter 22, therefore, is used to limit the frequencies of channels which are to be considered by the off-load cellular system, i.e., filter 22 excludes signals which are not of interest to the off-load cellular system but which may be of interest to other systems, such as other cellular systems or marine based systems, etc. Filter 22 then transmits the filtered signal to the low noise amplifier (LNA)/splitter 24 via, for example, a coaxial cable which may be connected to the low noise amplifier/splitter 24 via an N-type connector.

Low noise amplifier/splitter 24 is conventional and amplifies the signal received from filter 22 and splits the signal into various identical signals which are then output to each transceiver 26. The signal is amplified in the low noise amplifier/splitter 24 since there is a great deal of loss in the signal when the signal is split. The low noise amplifier/splitter 24 is connected to the transceiver 26 via, for example, a coaxial cable using, for example, an N-type coaxial connection.

Conventional transceiver 26 receives the signal from the low noise amplifier 24 which is in the standard interface format used between mobile telephones and cellular systems i.e., Electronic Industries Association (EIA)-553 publication. The transceiver 26 boosts the received signal using a preamplifier and then demodulates the signal into 10 kHz Manchester encoded data. The transceivers 26 may be preprogrammed by the transceiver control and interface system 28 to receive specific channels of interest which are broadcast by the mobile telephone for call registration, call origination or page response messages. The transceiver is connected to the transceiver control and interface system 28 using, for example, a 25 conductor cable assembly with a D-sub connector.

The transceiver control and interface system 28 receives the Manchester encoded data from the transceiver 26, decodes the Manchester encoded data received from transceiver 26 and extracts information received from the mobile telephone such as mobile identifier, electronic serial number, telephone number, etc. The transceiver control and interface system 28 then sends the decoded data to the system control computer 30 using, for example, a conventional RS-232 interface cable connection. The protocol used between the transceiver control and interface system 28 and the system control computer 30 can be any standard protocol such as an asynchronous 8 bit transmission protocol. The data which is received by the system control computer 30 initially transmitted from the mobile telephone is typically either a mobile telephone registration, origination or page response message.

Figure 4:
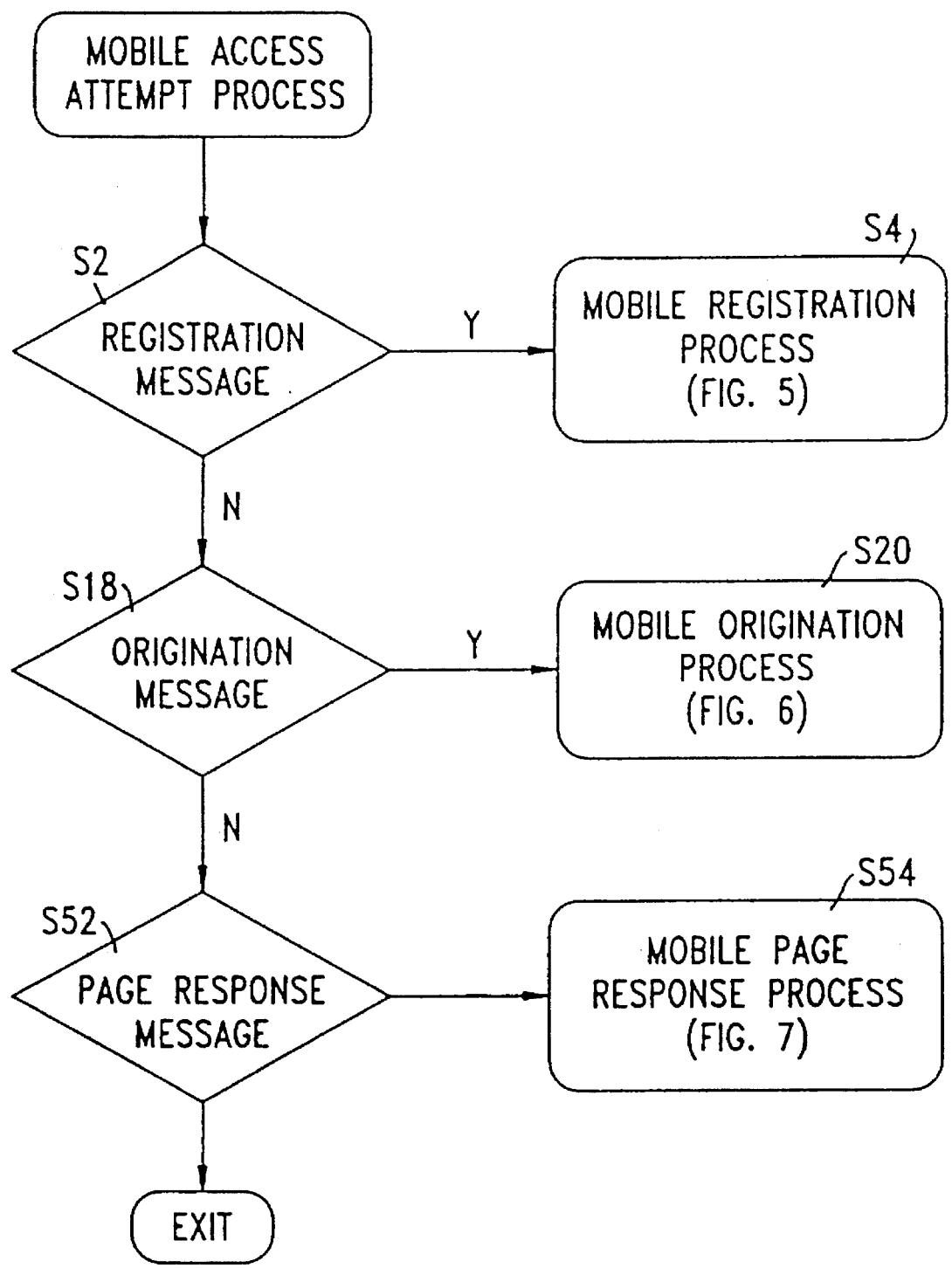
FIG. 4 is a flowchart describing the mobile access attempt process of the present invention.
Figure 5:
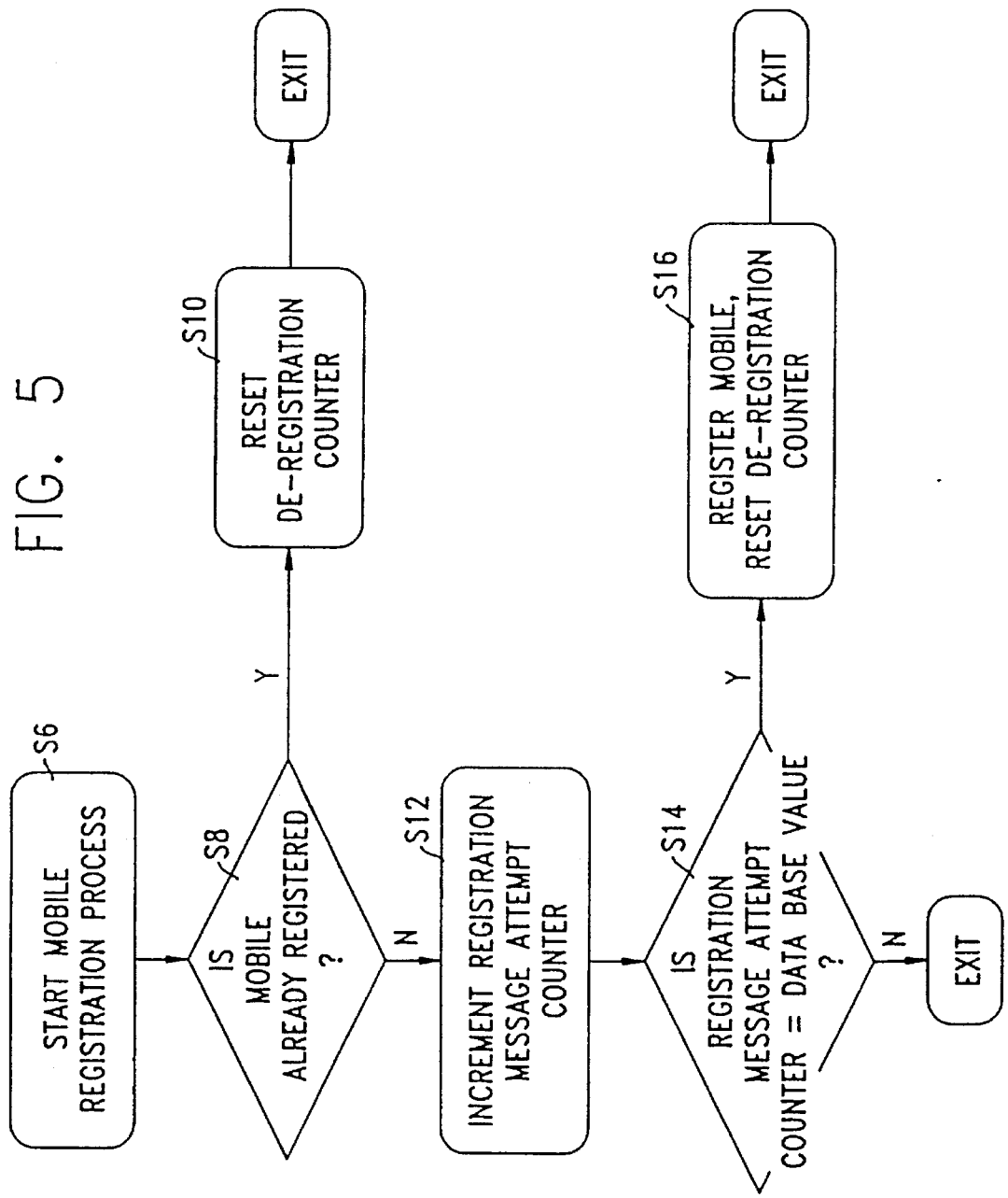
FIG. 5 is a flowchart describing the mobile registration message process of the present invention.

The operations which are performed by the system control computer 30 for the various messages are shown in FIGS. 4–11. When the mobile access attempt from the mobile telephone is a registration message, the system control computer 30 in step S2 of the FIG. 4 determines that the mobile registration process should be performed in step S4 which is shown in FIG. 5. The mobile registration process is then started in step S6 of FIG. 5 by the system control computer 30. The off-load cellular system will permit mobile registration, when the off-load cellular system is configured for autonomous registration, in the system control computer 30. Autonomous registration is typically used in cellular systems to permit the cellular system to verify that a mobile telephone user may be provided with cellular service before the mobile telephone user has dialed a calling number and pressed a send key on the mobile telephone. Thus, autonomous registration permits the mobile telephone to be immediately connected with the calling party when dialing a calling number since the mobile telephone has been previously validated. When autonomous registration is not used, the mobile telephone placing the call must be validated, which requires additional time before the mobile telephone is connected with the calling party.

The registration process of the present invention utilizes the conventional registration process which detects the presence of mobile telephones prior to a call attempt and which is described in the cellular radio telecommunications system operations interface specification EIA-553. In order for the mobile telephone to perform autonomous registration, the system control computer 30 pre-programs the transceiver control and interface system 28 to transmit to the mobile telephone the standard interface message including registration bits which are set to indicate to the mobile telephone upon examination of the registration bits to perform autonomous registration according to the interface specifications EIA-553.

In addition, a mobile telephone may be validated, for example, for credit worthiness, using a conventional visitor location register (VLR) 32 which would be connected to the system control computer 30 via an RS-232 data interface; the visitor location register 32 may then interface with a conventional home location register (HLR) service using an IS-41 cellular signalling network or alternatively, the visitor location register 32 could access directly via, for example, a dial-up modem, a clearing house, such as GTE Telecommunication Services, which can validate the mobile telephone for the off-load cellular system.

Figure 9:
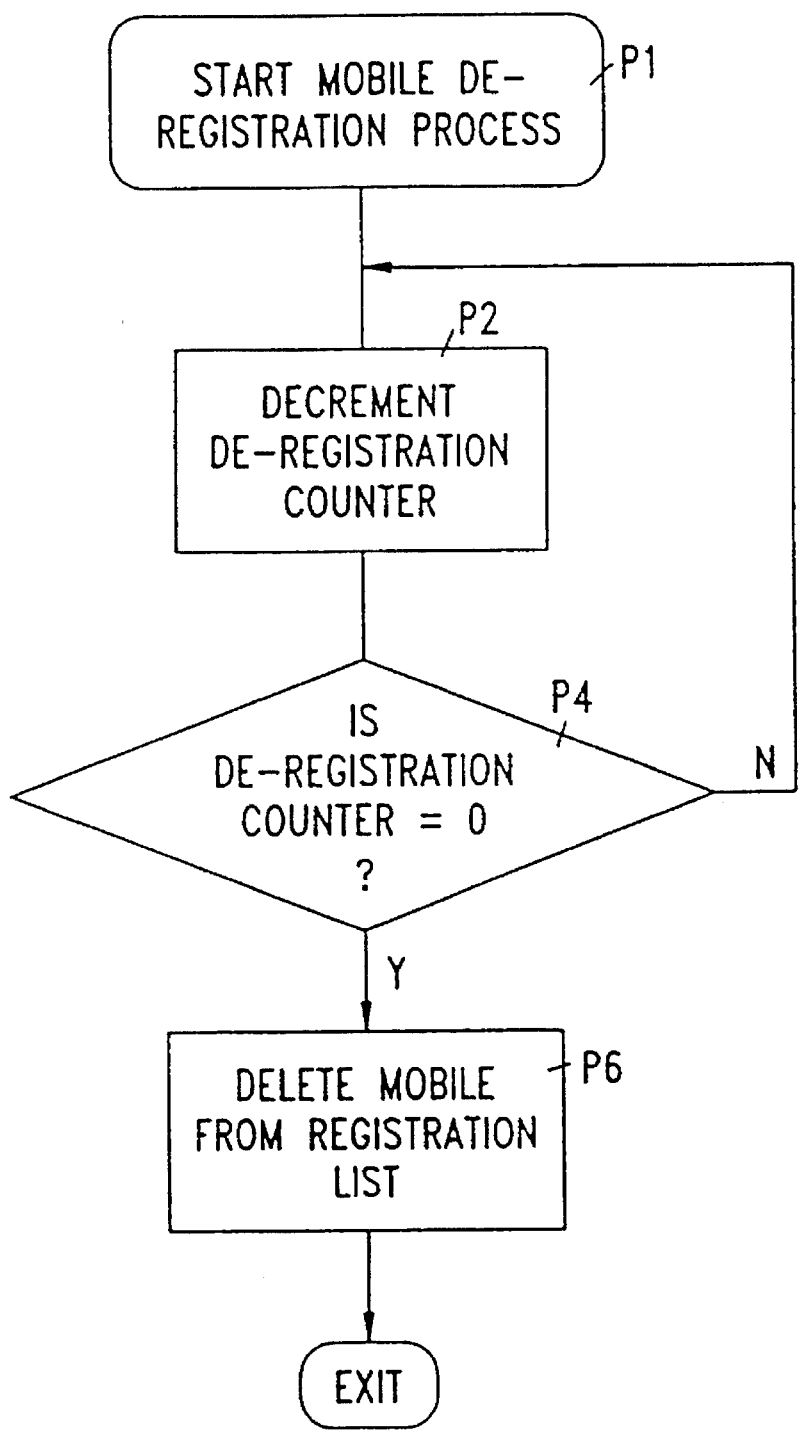
FIG. 9 is a flowchart of the mobile de-registration process of the present invention.

As shown in FIG. 5, the system control computer 30 determines whether the mobile telephone (or "mobile") is already registered in step S8, and if the mobile telephone is already registered, the system control computer 30 resets the de-registration counter of the de-registration process in step S10. The de-registration process constantly monitors whether the mobile telephone is attempting to register with the off-load cellular system. As shown in FIG. 9, the system control computer 30 decrements the de-registration counter in step P2 based upon a predetermined time interval. In step P4, the system control computer 30 determines whether the de-registration counter is equal to 0, indicating that the mobile telephone has failed to register again within the prescribed amount of time. If the de-registration counter in step P4 is not 0, then control is directed back to step P2 for decrementing the de-registration counter at the next specified time interval. If, however, the de-registration counter is 0, then the system control computer 30 deletes the mobile telephone from a registration customer list maintained by the system control computer 30 thus indicating that the mobile telephone is now no longer registered with the off-load cellular system. From step S10 in FIG. 5, the mobile registration process and the mobile access attempt process are then exited until the system control computer 30 receives another access attempt from the transceiver control and interface system 28.

If the system control computer 30 determines in step S8 of FIG. 5 that the mobile telephone is not already registered, then the system control computer 30 increments the registration message attempt counter in step S12 and determines whether the registration message attempt counter is equal to a preset data base value in step S14. If the registration message attempt counter is equal to the database value, then the mobile telephone has attempted to register several times indicating that the mobile telephone is a suitable off-load cellular system user and, therefore, the system control computer 30 in step S16 registers the mobile telephone, and resets the de-registration counter. The mobile registration process is then exited until the next access attempt is received by the system control computer 30.

Figure 6:
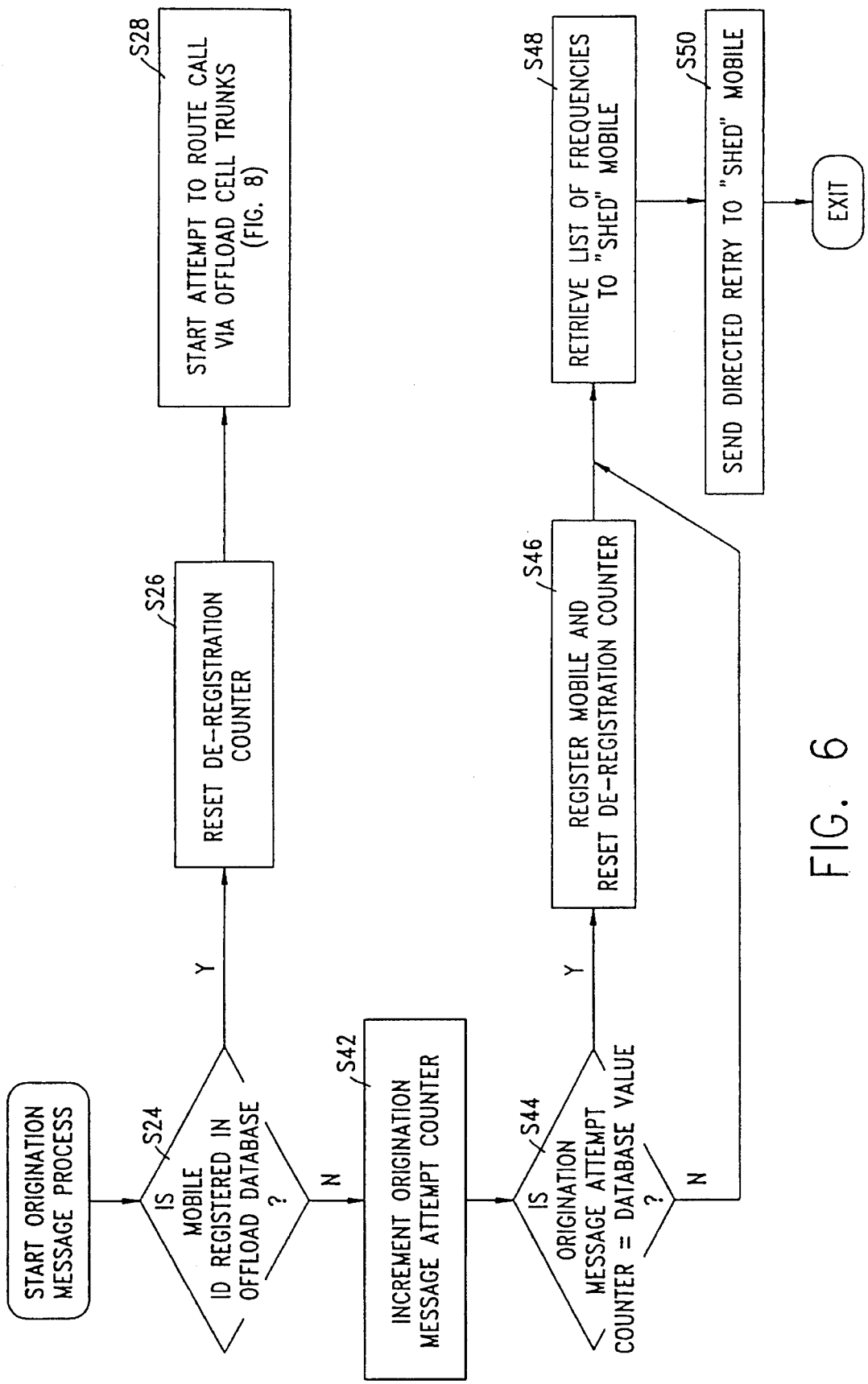
FIG. 6 is a flowchart describing the mobile origination message process of the present invention.
Figure 7:
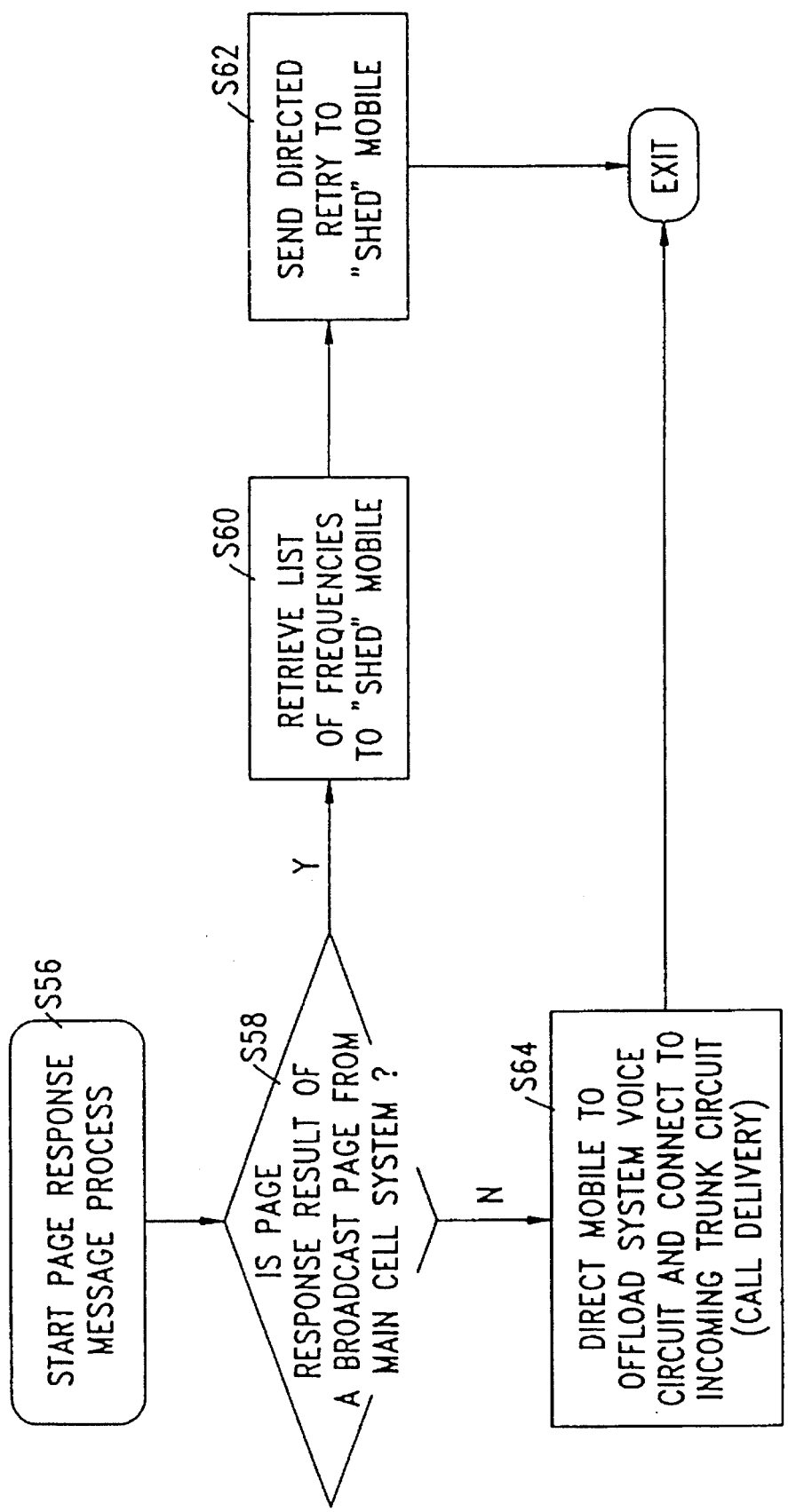
FIG. 7 is a flowchart of the mobile page response message process of the present invention.

If the system control computer 30 determines in step S18 of FIG. 4 that the mobile access attempt is an origination message, the origination message process is started in step S22 in FIG. 6 by the system control computer 30. The system control computer 30 first determines in step S24 whether the mobile identifier received from the transceiver control and interface system 28 is included in a conventional system control computer database (not shown). If the mobile identifier of the mobile telephone which has initiated the origination message is in the system control computer database, the system control computer 30 resets the de-registration counter in step S26 and then attempts to route the call using the off-load cellular trunks in step S28 which is shown in FIG. 8.

Figure 8:
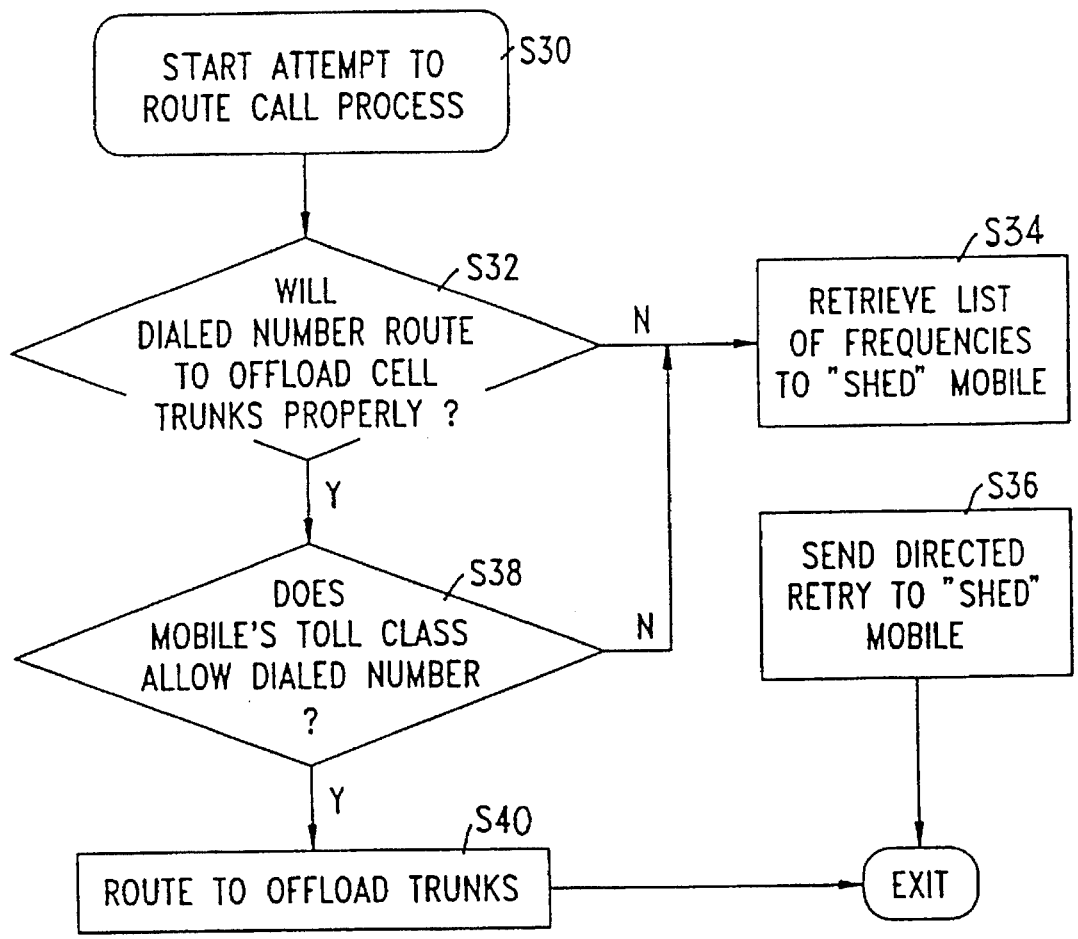
FIG. 8 is a flowchart of a route attempt process of the present invention.

The attempt to route out the mobile telephone call to the off-load cellular trunks starts in step S30 of FIG. 8. The system control computer 30 first determines whether the number dialed by the mobile telephone will route to the off-load cellular trunks in step S32. If the dialed number is not valid for the off-load cellular system, then the system control computer 30 will retrieve a list of frequencies to be used to remove or shed the mobile telephone from the off-load cellular system back to the main cellular system in step S34. These frequencies are previously determined to be compatible with the main cellular system, and therefore, the mobile telephone should be able to obtain cellular service using the main cellular system once the system control computer 30 indicates, to the transceiver control and interface system 28, to broadcast a control message preferably including a directed retry message in step S36. The directed retry message is formulated according to existing EIA-553 interface specifications and indicates, to the mobile telephone, to tune to the specific frequencies of the main cellular system which are included in the directed retry message. After step S36 is performed, the attempt to route call process is exited until another origination message is received which includes a mobile identifier which matches the mobile identifier stored in the system control computer database.

If the dialed number will route to the off-load cellular trunks in step S32, the system control computer 30 determines whether the mobile telephone's toll class will allow the dialed number. If the mobile telephone's toll class will not allow the dialed number, then the mobile telephone is shed from the off-load cellular system in steps S34 and S36 by the system control computer 30 as described previously. If the mobile telephone's toll class will allow the dialed number, then the off-load cellular system will route the dialed number to off-load trunks in step S40 in order to connect the mobile telephone call to the telephone equipment associated with the dialed number. The attempt to route call process then exits.

If the system control computer 30 determines that the mobile identifier is not in the system control computer data base in step S24 of FIG. 6, an origination message attempt counter is incremented in step S42 and the system control computer 30 then determines whether the origination message attempt counter is equal to a predetermined database value in step S44. If the origination message attempt counter is equal to the database value, then the mobile is registered and the de-registration counter is reset by the system control computer 30 in step S46. The mobile is then shed from the off-load cellular system in steps S48 and S50 as previously described with respect to steps S34 and S36 shown in FIG. 8. If the origination message attempt counter is not equal to the database value, then the mobile is not registered and the mobile is then shed from the off-load cellular system in steps S48 and S50. After step S50 is performed, the origination message process is then exited until the next origination message is received, as discussed above.

If the system control computer 30 determines that a page response message is received from the mobile telephone in step S52, of FIG. 4 which is in response to a page message from either the main or off-load cellular systems, then the mobile page response process is performed in step S54. The page response message process starts in step S56 of FIG. 7, and the system control computer 30 determines whether the page response which has been received from the transceiver control and interface system 28 is a result of a page message broadcast from the main cell system. If the page response is a result of a page message broadcast from the main cell system, the system control computer 30 retrieves a list of frequencies in step S60 to include in the directed retry message which is then sent to the mobile telephone via the transceiver control and interface system 28 in step S62. As indicated earlier, the list of frequencies which are used for broadcasting the directed retry message may be obtained beforehand and stored in the system control computer based upon the off-load cellular system's location or ability to receive the control messages from the neighboring main cellular systems. For example, the system control computer 30 may store only two or three frequencies to use for broadcasting the directed retry message which represent the two or three cell sites of the main cellular system which are located near the off-load cellular system. Thus, these two or three main cellular systems will typically broadcast the strongest signal strength for the off-load cellular system region and, therefore, the mobile telephone needs only to be informed to retune to these two or three frequencies when the off-load cellular system sheds the mobile telephone. Alternatively, the signal strength of the various main cell systems can be monitored by the main cell page monitor 34, discussed below, and the main cell page monitor 34 can inform the system control computer 30 of the frequencies which are the strongest to insure that the mobile telephone tunes to a frequency of the main cellular system which would be of the strongest signal strength thereby obtaining better reception for voice communication.

If the system control computer 30 determines that the page response is not a result of a page message broadcast from the main cellular system in step S58, then the system control computer sends a message via the transceiver control and interface circuit 28 to indicate to the mobile telephone to use a voice circuit of the off-load cellular system.

If the system control computer 30 determines that the page response is a result of a page message broadcast from the main cellular system in step S58, the main cell page monitor 34 receives the main cell page and rebroadcasts the page so that the mobile telephone located in the off-load cellular system will receive the main cell page.

The system control computer 30 which implements the above processes may be a conventional IBM compatible personal computer using, for example, a conventional 386 type microprocessor chip.

The call delivery process is a standard function of the IS-41 interface specifications which allows a cellular system which receives a call attempt to one of its mobile telephones to deliver the call to another cellular system which is providing cellular service to the mobile telephone using the standard IS-41 interface protocol. Once the voice circuit is connected to the incoming trunk circuit in step S64, the page response message process ends.

The main cell page monitor 34 in FIG. 3A is used for receiving page messages of the main cellular system via receive antennas 36 and for indicating to the system control computer 30 via a standard RS-232 data interface the content of the page messages received from the main cellular system. The system control computer 30 will then transmit the page message to be rebroadcast to transceiver control and interface system 28. Transceiver control and interface system 28 then formats the message as described above to enable the mobile telephone to receive the page message in the proper format according to EIA-553 specifications. The formatted message is then transmitted to transceivers 26 for transmitting the message to the mobile telephone. The signals which are to be transmitted may be amplified in conventional power amplifiers 38 and combined in conventional combiner 40. Alternatively, for low power implementation of the above off-load cellular system, power amplifiers 38 are not necessary. The combined signal is then filtered using conventional band pass filter 42 and then transmitted via conventional transmit antennas 44. Thus, a mobile which is currently locked on to the frequencies in the off-load cellular system will still be able to receive its pages from the main cellular system. Once the mobile is registered (steps s16 or s46) via IS-41 procedures, the main cellular system may provide busy features such as indicating to a telephone equipment user trying to reach the mobile telephone that the mobile telephone is currently in the busy status as well as providing call forwarding and call waiting features when the mobile telephone is provided with cellular service from the off-load cellular system. In addition, the mobile telephone which is locked on to the off-load cellular system will be able to receive similar call treatment as the main cellular system such as specific dialing patterns, restrictions, activated features, etc.

The off-load cellular system provides the above features in accordance with IS-41 interface specifications when an incoming call is routed to the off-load cellular system via the main cellular system. The system control computer 30 maintains a list of all mobile telephones currently locked on to the off-load cellular system. The main cellular system communicates to the off-load cellular system via the IS-41 network of the incoming call which may be originated, for example by a PSTN. System control computer 30 determines whether the called mobile telephone is busy, etc. by referring to the list of mobile telephones described above and informs the main cellular system of the called mobile telephone's status in accordance with IS-41 interface specifications. If the mobile telephone is not busy, transceiver control and interface system 28 receives the incoming call from the PSTN via, for example, conventional transmit/receive cable pairs and broadcasts the call to the mobile telephone to establish off-load cellular service. If the mobile telephone is busy, then the main cellular system may attempt, for example, call forwarding if this feature is selected by the mobile telephone.

Figure 10:
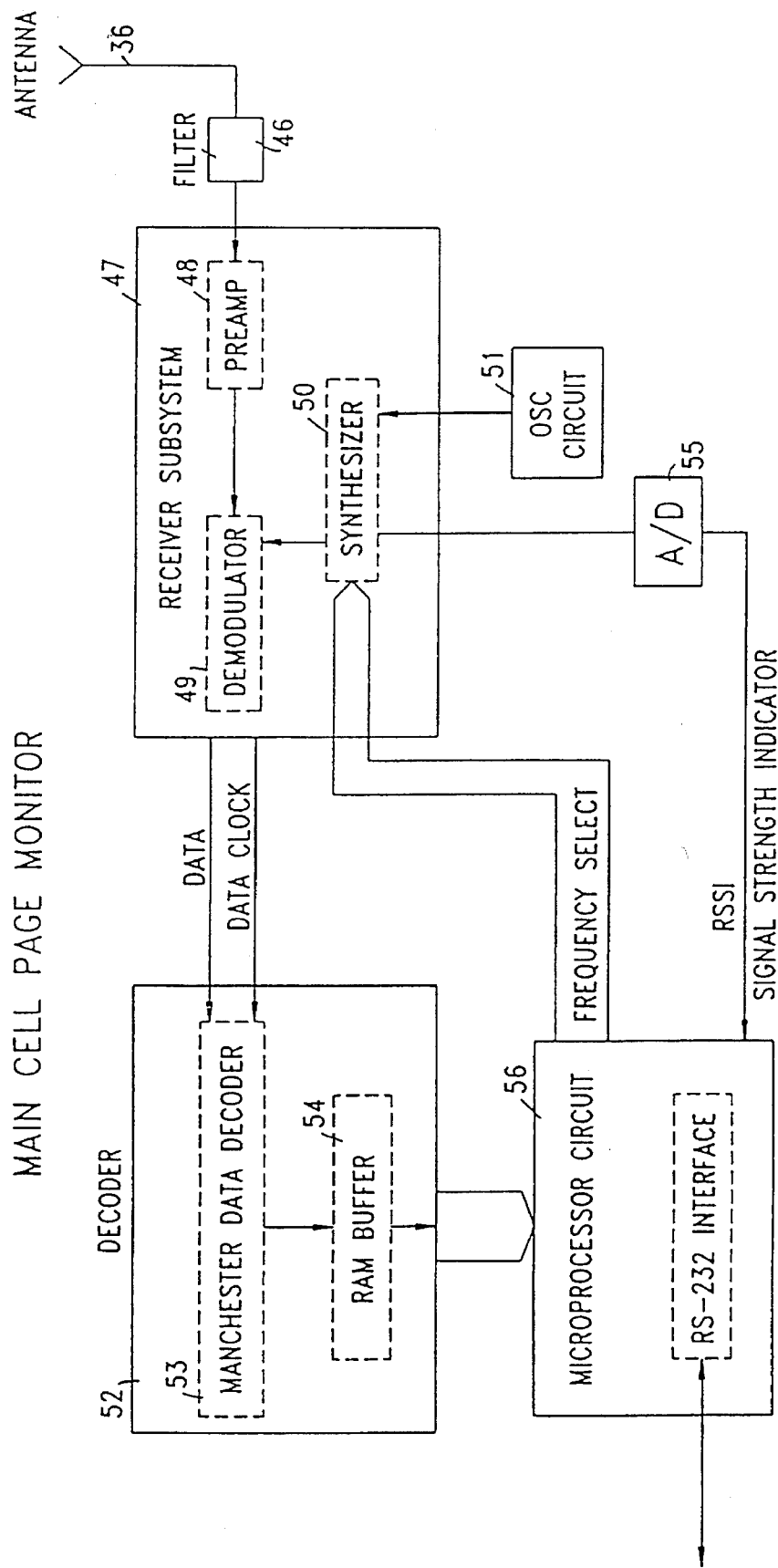
FIG. 10 is a block diagram of the circuit construction of the monitoring circuit of the first embodiment of the present invention.

FIG. 10 is a detailed description of the main cell page monitor of the present invention. In FIG. 10, receive antenna 36 receives the pages which are transmitted from the main cellular system. The signal is then transmitted to a conventional filter 46 which is preferably a bandpass filter permitting the cellular frequencies of interest to be input to the main cellular page monitor 34. The filtered signal is then transmitted to conventional receiver subsystem 47 such as NE605 and UMA1014 manufactured by Signetics via, for example, a coaxial cable having an N-type connector. The signal is first applied to conventional preamplifier 48, which boosts the input signal to prepare the signal for demodulation by a conventional demodulator 49. The demodulator 49 demodulates the boosted signal based upon synthesizer 50 which is controlled by the microprocessor circuit 56 to indicate to demodulator 49 which channel frequency is to be demodulated. Conventional oscillator circuit 51 is used as a reference clock for synthesizer 50 for determining the proper 30 kHz signal which is to be demodulated. The demodulator 49 then outputs 10 kHz Manchester encoded data to the Manchester data decoder 53 located in decoder 52 via a standard electrical connection.

Conventional Manchester data decoder 53 decodes the received data and temporarily stores the decoded data in conventional RAM buffer 54. The Manchester data decoder 53 may be, for example, UMA 1000T manufactured by Signetics. The data is then transmitted from the RAM buffer 54 to conventional microprocessor circuit 56 via a standard data bus, such as I$^2$C. The microprocessor circuit 56 then accepts the decoded data from decoder 52, analyzes the forward control channel information, and transmits the appropriate decoded data to the system control computer 30 via a standard RS-232 interface. In addition, synthesizer 50 may be used to transmit the signal strength data for each of the 30 kHz channels to the microprocessor circuit 56 via analog to digital converter 55 to determine which channels or frequencies are to be used for page monitoring and the directed retry as discussed above.

Figure 11:
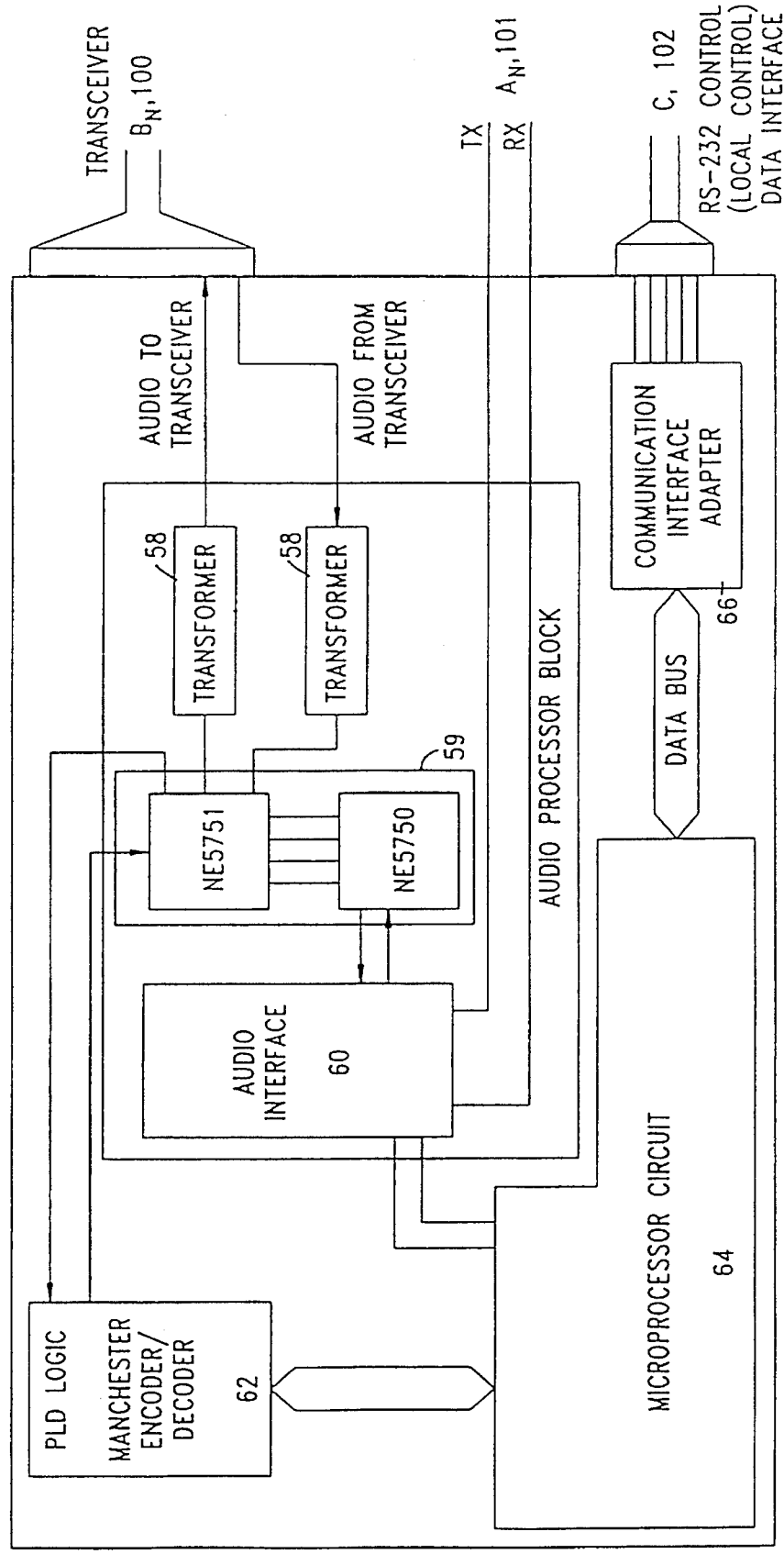
FIG. 11 is a block diagram of the circuit construction of the transceiver control and interface circuit of the present invention.

FIG. 11 describes the transceiver control and interface system 28 of the first embodiment of the present invention. In FIG. 11, the transceiver control and interface system 28 controls the radio transceiver 26 and performs all the audio and data processing necessary for voice channel or control channel functions. Transceiver control and interface system 28 controls transceiver 26 through conventional interface 100, which has two balanced 600 ohm pairs for analog signal processing, a ten bit transistor-transistor-logic (TTL) level output that is used to set the transmit and receive frequencies of transceiver 26 and a TTL output to enable the transmitter within transceiver 26. In addition, an analog input for signal strength measurement may also be provided by interface 100 used for handoffs which will be described later in connection with the second embodiment of the present invention.

In transceiver interface and control system 28, when an analog/audio signal is received by transceiver 26 from the mobile telephone through interface 100 on a balanced 600 ohm pair, the audio signal is transmitted to analog signal processing circuit 59 via conventional transformers 58 for impedance matching. Transformers 58 may be, for example, N6385 manufactured by PICO Electronics, Inc. Analog signal processing circuit 59 filters and conditions the received signal according to EIA-553 specifications and outputs the conditioned signal to audio interface 60. Analog signal processing circuit 59 may be constructed of, for example, an NE5751/NE5750 chip set manufactured by Philips Semiconductors.

The processed audio signal which has been filtered, deemphasized, and expanded by analog processing circuit 59 is then transmitted to conventional audio interface circuit 60. Audio interface circuit 60 may be, for example, a CH1834 telephone line interface module manufactured by Cermetek Microelectronics. In addition, manchester encoder/decoder circuit 62 monitors the supervisory audio tone (SAT) and signalling tone to determine connection status. Audio interface circuit 60 receives the analog signal prepares the conditioned analog signal for outputting to a Public Switching Telephone Network (PSTN) via conventional analog telephone interface 101. Microprocessor 64 also controls audio interface 60 for sending dialing tones, seizing and releasing the telephone line connected to interface 101.

Likewise, the analog/audio signal received from the PSTN is conditioned by audio interface circuit 60 and is then transmitted to analog processing circuit 59. The analog signal is then filtered, compressed, pre-emphasized and limited to a maximum frequency deviation preferably of ±12 KHZ. Audio interface 60 is controlled by microprocessor circuit 64 through a conventional serial address/data bus structure. The processed analog signal is then transmitted from analog signal processing circuit 59 via transformers 58 to transceiver 26 through interface 100 using the 600 ohm balanced transmission pair.

When the signal received from transceiver 26 is used as a setup channel, the signal is transmitted to transformers 58 and then to analog signal processing circuit 59 as discussed previously. The analog signal processing circuit 59 then transmits the conditioned setup signal to manchester encoder/decoder 62 which decodes the received setup signal according to EIA-553 specifications for microprocessor circuit 64.

Manchester encoder/decoder circuit 62 may be logic programmed using conventional programmable logic devices such as EPM 5128-J2 manufactured by Altera. To buffer the data into and out of the manchester coder/decoder circuit 62, conventional field programmable gate array is programmed in two serializing First-In First-Out (FIFO) 64×8 memories are preferably provided in the manchester coder/decoder circuit 62 which may be, for example, an iFX780 Field Programmable Gate Array manufactured by Intel Corporation. One of the FIFOs is used to buffer incoming decoded manchester data, and the second FIFO is used to buffer outgoing data to be encoded by manchester coder/decoder circuit 62.

Microprocessor circuit 64 reads the data from manchester coder/encoder circuit 62 to determine the function necessary to process a call attempt or customer vertical feature as well as connection status. The data is then transmitted from microprocessor circuit 64 to system control computer 30 through interface 102 which is a conventional RS-232 port via conventional RS-232 circuit 66. RS-232 circuit 66 may be constructed by, for example, an 82510 circuit manufactured by Intel and a buffer MC145406 manufactured by Motorola. Data received from system control computer 30 through interface 102 is processed by microprocessor circuit 64 and data to be transmitted to transceiver 26 is written to the output buffer FIFO of manchester coder/decoder circuit 62 as previously discussed.

When microprocessor circuit 64 writes data to manchester encoder/decoder circuit 62, manchester encoded data is transmitted to analog processing circuit 59 where it is modulated and summed with the analog output and transmitted to transceiver 26. Likewise, decoded manchester data received from transceiver 26 is output to the FIFO where it is read by microprocessor circuit 64. Microprocessor 64 is conventional and may be, for example, an 80C186EB circuit manufactured by Intel.

Once the system control computer 30 receives the encoded data from the transceiver control and interface system 28, the system control computer 30 will process the received data which will typically relate to, for example, providing a call waiting feature, or indicating to a calling party that the mobile telephone is currently busy on another trunk circuit. Whenever a message needs to be sent or broadcast by transceiver 26 to a mobile telephone in the off-load cellular system (e.g., for indicating to mobile telephone to retune to main cellular system), system control computer 30 sends a message to microprocessor 64 through interface 102. Microprocessor circuit 64 then formats the received data and writes the data to the FIFO used to transmit data in manchester coder/decoder circuit 62 which encodes the data to be broadcast by transceiver 26 as discussed above.

Figure 12:
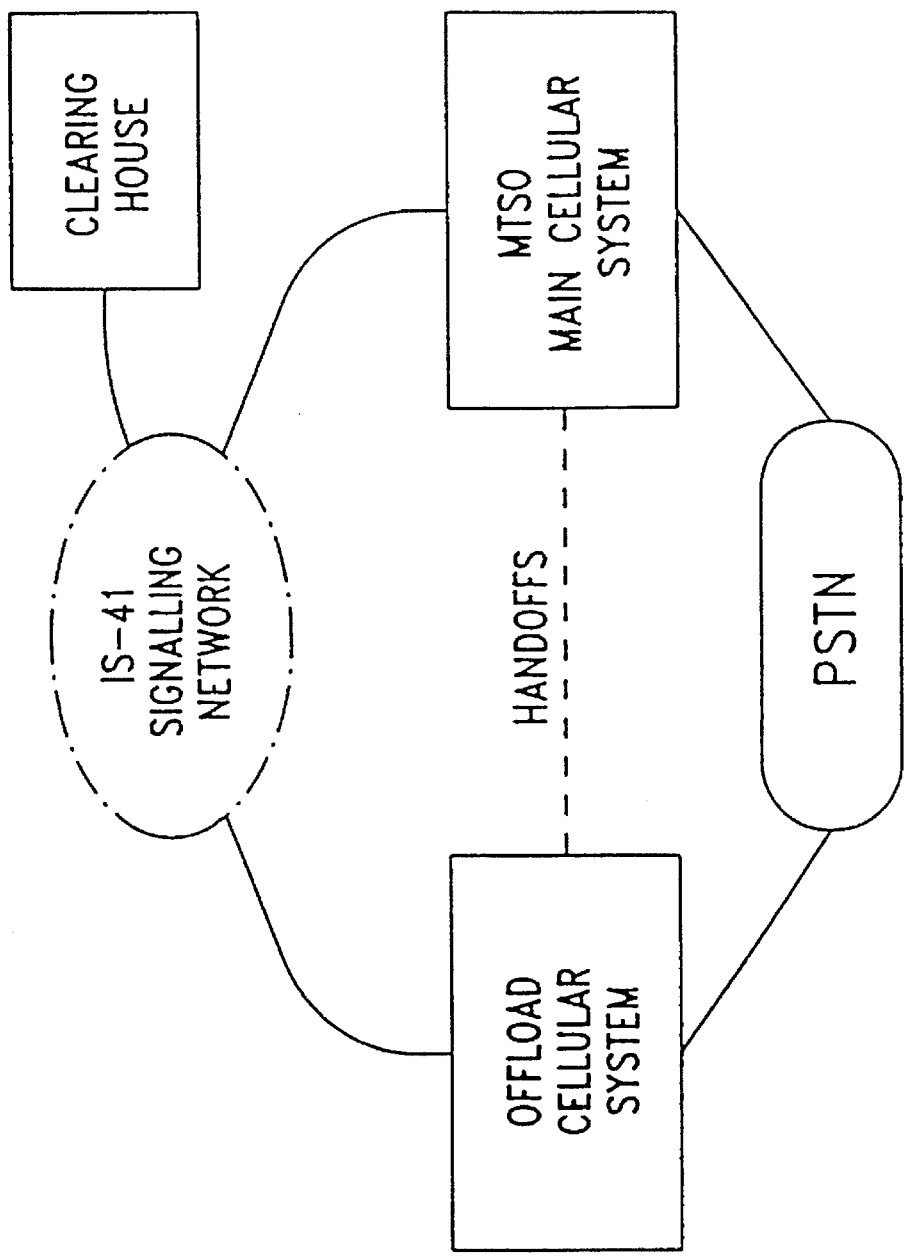
FIG. 12 is an illustration of the interaction between the cellular system of the present invention with a mobile telephone switching office of a main cellular system according to the second embodiment of the invention.
Figure 13A:
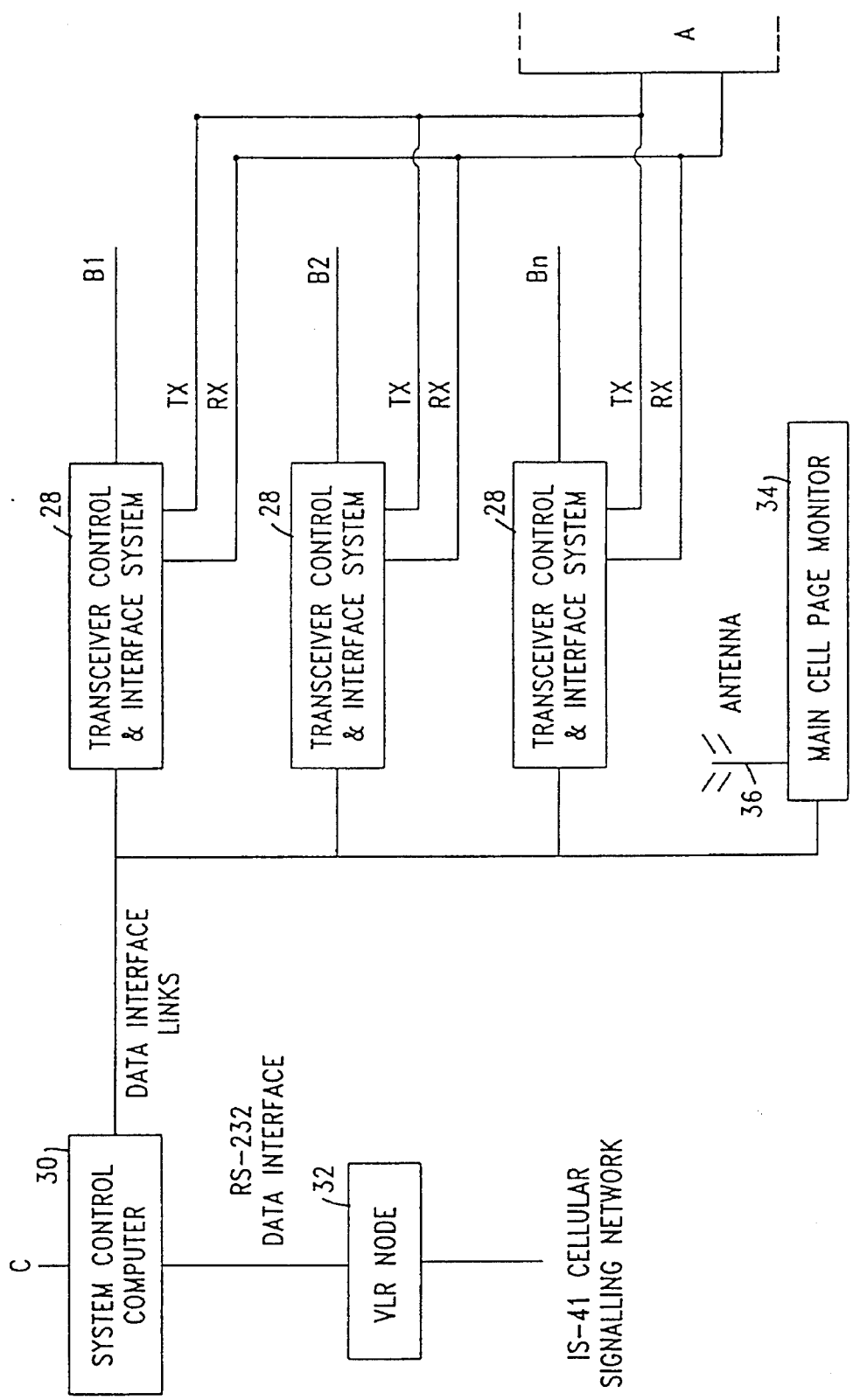
FIGS. 13A–13C together comprise a block diagram of the circuit construction of the present invention according to the second embodiment.
Figure 13B:
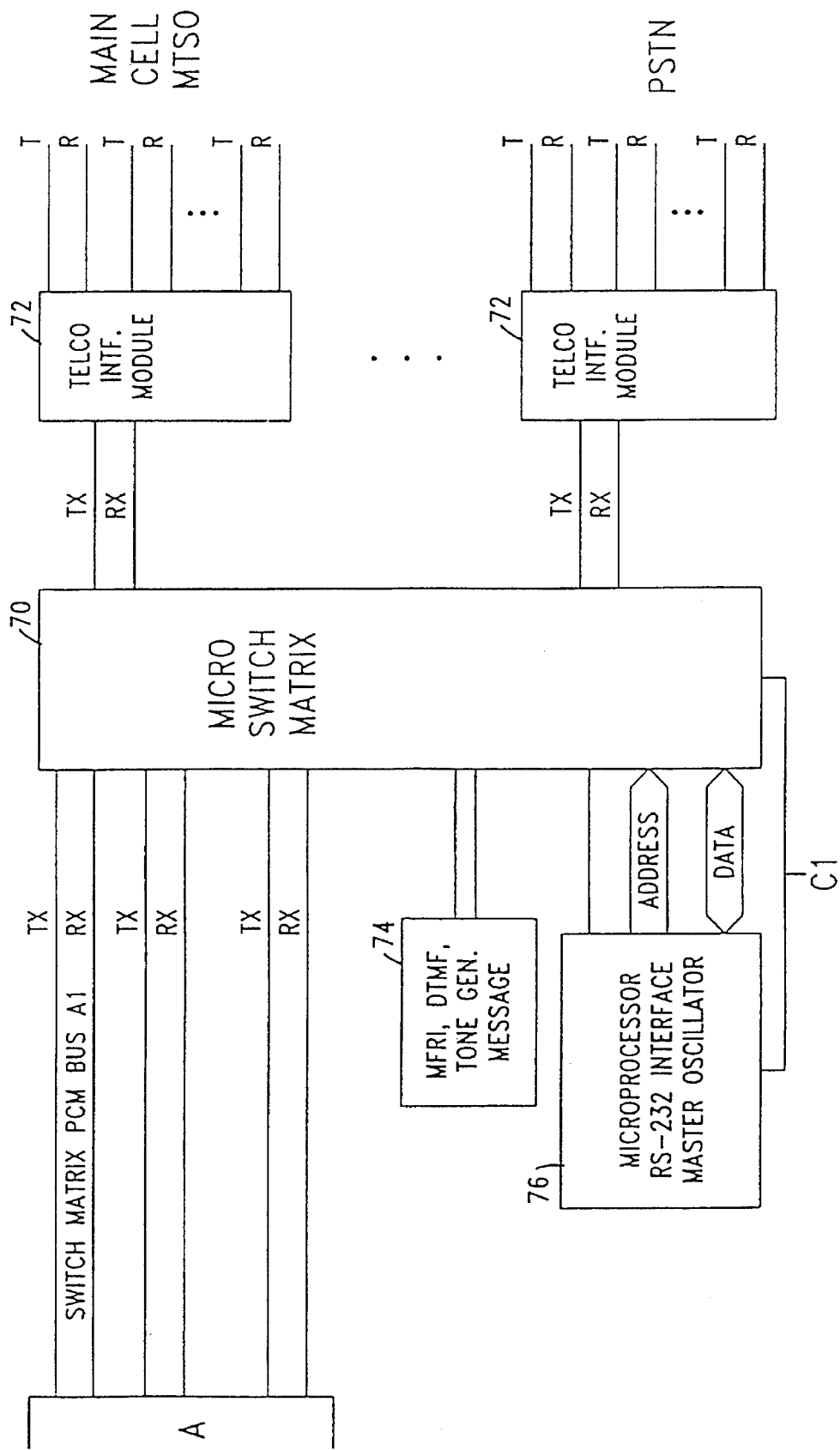
Figure 13C:
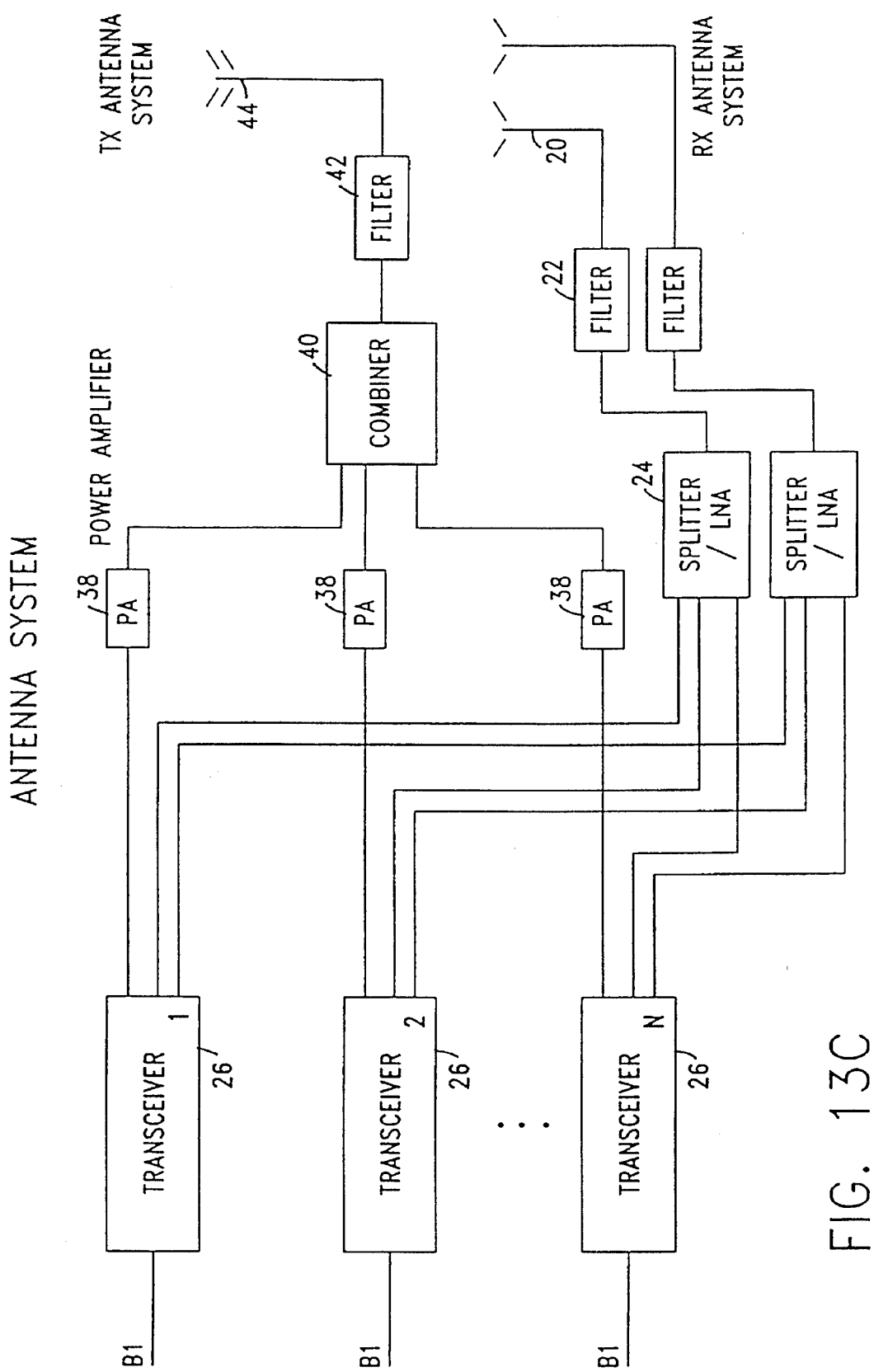

A conceptual description of a second embodiment of the present invention is described with reference to FIG. 12. In FIG. 12, the off load cellular system 8 is connected to the main cellular system 12 via the IS-41 signalling network 17 to provide the call delivery feature as described in the first embodiment as well as a direct connection with the main cellular system 12 via an IS-41 trunk circuit which is used for intersystem handoff between the main cellular system and the off-load cellular system. Thus, the present invention, according to the second embodiment, also includes the feature of being able to handoff a mobile telephone call between a main cellular system and an off-load cellular system which may be located in a high concentration area of the main cellular system. FIGS. 13A–13C show the basic structural configuration of the second embodiment of the present invention. Since the second embodiment includes additional features not provided by the first embodiment of the invention, only the differences between the first and second embodiments will be discussed. In FIGS. 13A–13C a switch matrix 70 is used for connecting the mobile to, for example, a main cell system or to a public switching telephone network via tellco interface module set 72. The switch matrix 70 is conventional and may be MT8980D manufactured by Mitel Semiconductor, and the tellco interface module 72 is conventional as well and may be D4 Channel Bank DCB24 manufactured by Telco Systems. The tellco interface module 72 prepares the signal for proper connection to, for example, a PSTN via a tip/ring pair. In addition, switch matrix 70 is connected directly to the main cellular system via a trunk cable such as a T-1 cable for implementing handoffs in a conventional manner. Switch matrix 70 is used to switch or cross-connect voice data received from the transceiver and interface system 28 via a conventional digital bus interface, such as a PCM bus interface, and is controllable via conventional microprocessor 76 which controls the switching performed by switch matrix 70. The microprocessor 76 is also connected to the system control computer 30 which indicates to microprocessor 76 the desired switching to be performed in switch matrix 70. System control computer 30 also preferably receives the signal strength level of the message received from the mobile telephone. The signal strength is preferably determined by transceiver control and interface module 28 in a conventional manner. Once system control computer 30 receives the signal strength, system control computer 30 preferably determines whether the mobile telephone is required to be handed off to the main cellular system. Additionally, conventional tone generator 74 is also provided which is connected to switch matrix 70 for providing tones for call processing and call treatment.

Figure 14:
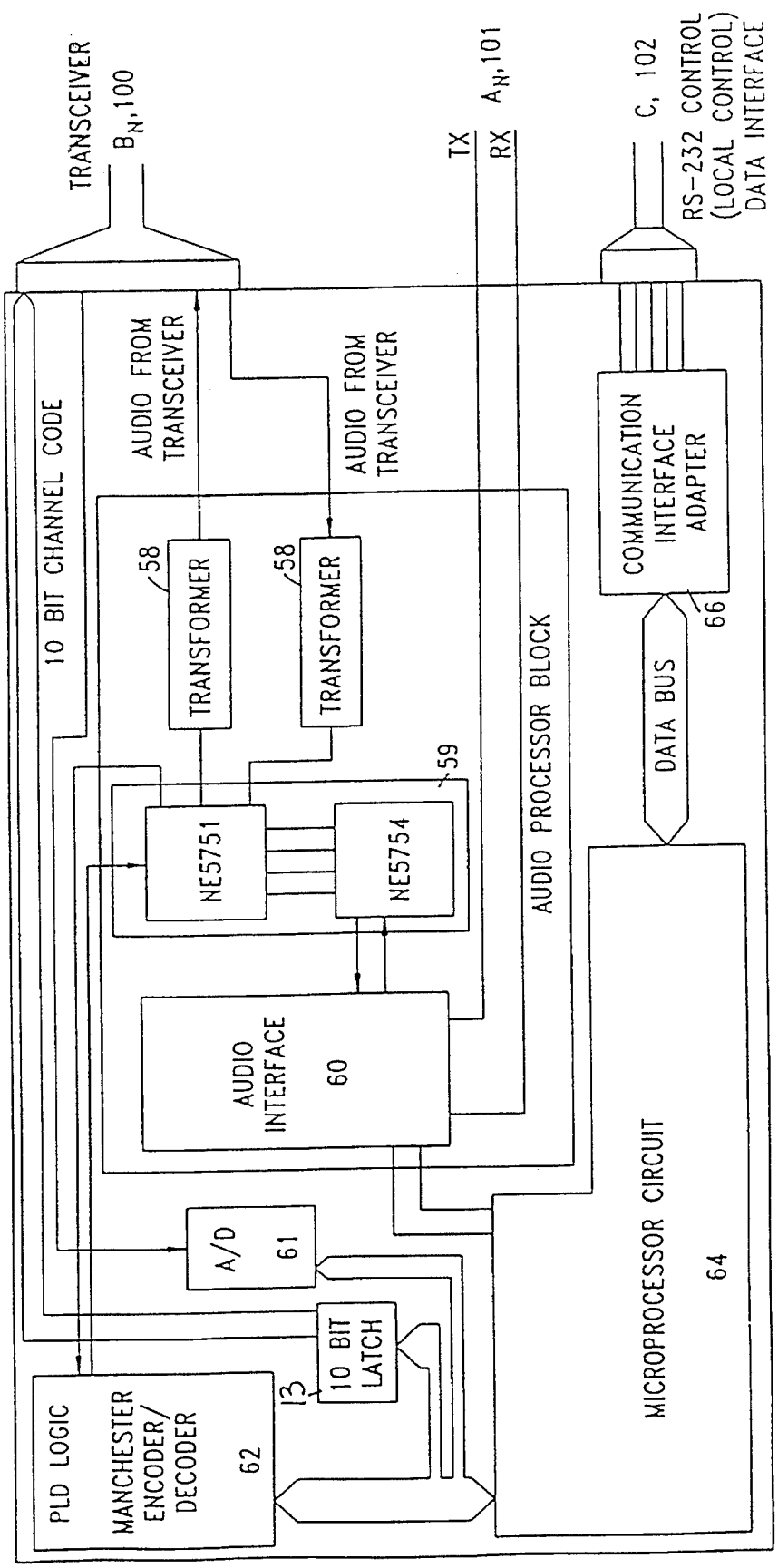
FIG. 14 is a block diagram of the circuit construction of the transceiver control and interface circuit of the second embodiment of the present invention.

FIG. 14 is a block diagram of the circuit construction of the transceiver control and interface circuit 28 of the second embodiment of the present invention. The operation of the transceiver control and interface circuit 28 has been previously discussed with reference to the first embodiment (FIG. 11), and therefore, only the differences between the embodiments will be discussed.

The additional features of the transceiver control and interface circuit 28 involve handoff capability between the off-load and main cellular systems. For example, in the second embodiment, since switch matrix 70 is provided, audio interface circuit 60 must be able to interface with switch matrix 70. Thus, audio interface circuit 60 may be a coder/decoder circuit such as MT8962 manufactured by Mitel. Coder/decoder circuit (audio interface 60) converts the processed analog signal into a digitized Pulse Code Modulation (PCM) signal. The PCM signal is then transmitted by a conventional serial bus interface 101 to switch matrix 70 where the transmitted PCM signal can be switched via interface 101. Interface 101 includes two conventional serial PCM buses that provide a conventional 64 Kilobit/sec PCM path to the switch matrix 70. Likewise, the PCM signal received from switch matrix 70 is converted to an analog signal by the coder/decoder circuit and is then transmitted to analog processing circuit 59. The analog signal is then filtered, compressed, pre-emphasized and limited to a maximum frequency deviation preferably of ±12 KHZ. The processed analog signal is then transmitted from analog signal processing circuit 59 via transformers 58 to transceiver 26 through interface 100 using the 600 ohm balanced transmission pair.

Microprocessor circuit 64 sets the transceiver channel of transceiver 26 by writing a 10 bit code to conventional latch circuit 63. Latch circuit 63 may be constructed of, for example, two 74LS374 eight bit latches manufactured by Texas Instruments. The TTL level outputs of latch circuit 63 are transmitted to transceiver 26 through interface 100. Additionally, one of the output bits from latch circuit 63 is also transmitted to transceiver 26. These TTL level outputs are used to enable the transmitter in transceiver 26. In response to the 10 bit channel code output by latch 63, transceiver scans certain frequencies and takes a receive signal strength indicator (RSSI) measurement to measure the strength of the mobile telephone's signal. The RSSI signal is then transmitted back to microprocessor 64 through interface 100 and conventional analog-to-digital (A/D) converter circuit 61 to be used to determine whether a handoff between the main and off-load cellular systems is appropriate according to standard EIA-553 specifications. A/D converter circuit 61 may be, for example, an ADC0820 manufactured by Analog Devices. This collected data is then sent from microprocessor 64 to system control computer 30 via interface 102 to determine whether a handoff operation is to be performed. Microprocessor 64 is also connected to the coder/decoder (audio processing circuit 60) for power up/down and to set the channel or time slot to transmit the data to switch matrix 70.

Thus, the second embodiment of the present invention permits the off-load cellular system to hand off a mobile telephone user who is leaving the off-load cellular system to a main cellular system without requiring the mobile telephone user to place a new call. The handoff procedure implemented according to the second embodiment is a standard handoff feature which is performed according to standard EIA-553/IS-41 interface specifications. Visitor location register 32 is used to inform the main cellular system via IS-41 cellular signalling network of the specific trunk channel where the mobile telephone which is to be handed off is located as determined by system control computer 30. Thus, when switch matrix 70 switches the mobile telephone to the main cellular system, the main cellular system knows where the mobile telephone is for connecting the mobile telephone call thus completing the handoff feature from the off-load cellular system. This procedure performed by the system control computer 30 and visitor location register 32 as described above, is conventional and is in accordance EIA-553/IS-41 interface specifications.

The many features and advantages of the invention are apparent from the detailed specification and thus is intended by the appended claims to cover all such features and advantages of the invention which fall within the true spirit and scope of the invention. Further, since numerous modifications and changes will readily occur to those skilled in the art, it is not desired to limit the invention to the exact construction illustrated and described, and, accordingly, all suitable modifications and equivalents may be resorted to, falling within the scope of the invention.

What is claimed is:

1. A control system for controlling cellular service between a main cellular system providing cellular service in at least one main cellular service area and an off-load cellular system providing off-load cellular service in an off-load cellular service area that is smaller than and within the at least one main cellular service area, the control system comprising:

a receiver circuit for monitoring the off-load cellular service area and receiving an origination message broadcast from a mobile telephone located in the off-load cellular service area, said receiver circuit having an output for outputting said received origination message; and a controller for receiving said origination message output from said receiver circuit, and for instructing the off-load cellular system whether to provide off-load cellular service to said mobile telephone responsive to Said origination message, wherein said controller prevents transient mobile telephones from being provided said off-load cellular service by requiring said mobile telephone to register with the off-load cellular system multiple times using said origination message.

2. A control system for controlling cellular service between a main cellular system providing cellular service in at least one main cellular service area and an off-load cellular system providing off-load cellular service in an off-load cellular service area that is smaller than and within the at least one main cellular service area, the control system comprising:
- a receiver circuit for monitoring the off-load cellular service area and receiving an origination message broadcast from a mobile telephone located in the off-load cellular service area, said receiver circuit having an output for outputting said received origination message;
- a controller for receiving said origination message output from said receiver circuit, and for instructing the off-load cellular system whether to provide off-load cellular service to said mobile telephone responsive to said origination message; and
- wherein said origination message includes calling information, and said controller determines whether said calling information is valid based upon predetermined criteria, and
  - when said calling information is valid, said controller instructs the off-load cellular system to provide said off-load cellular service to said mobile telephone, and
  - when said calling information is invalid, said controller instructs the off-load cellular service not to provide said off-load cellular service and to notify said mobile telephone to tune to the main cellular system, shedding said mobile telephone from the off-load cellular system.

3. A control system for controlling cellular service between a main cellular system providing cellular service in at least one main cellular service area and an off-load cellular system providing off-load cellular service in an off-load cellular service area that is smaller than and within the at least one main cellular service area, the control system comprising:
- a receiver circuit for monitoring the off-load cellular service area and receiving an origination message broadcast from a mobile telephone located in the off-load cellular service area, said receiver circuit having an output for outputting said received origination message;
- a controller for receiving said origination message output from said receiver circuit, and for instructing the off-load cellular system whether to provide off-load cellular service to said mobile telephone responsive to said origination message; and
- wherein said receiver circuit monitors the off-load cellular service area and receives a registration message broadcast from said mobile telephone, said receiver circuit output outputting said received registration message, and said controller receives said registration message output from said receiver circuit, determines whether the mobile telephone is registered in the off-load cellular system responsive to said registration message, and prevents transient mobile telephones from registering by requiring said mobile telephone to attempt to register with the off-load cellular system multiple times before registering said mobile telephone.

4. The control system according to claim 3, wherein said controller de-registers said mobile telephone registered with the off-load cellular system when said mobile telephone does not attempt to register within a predetermined time period.

5. A control system for controlling cellular service between a main cellular system providing cellular service in at least one main cellular service area and an off-load cellular system providing off-load cellular service in an off-load cellular service area that is smaller than and within the at least one main cellular service area, the control system comprising:
- a receiver circuit for monitoring the off-load cellular service area and receiving an origination message broadcast from a mobile telephone located in the off-load cellular service area, said receiver circuit having an output for outputting said received origination message;
- a controller for receiving said origination message output from said receiver circuit, and for instructing the off-load cellular system whether to provide off-load cellular service to said mobile telephone responsive to said origination message; and
  - wherein said receiver circuit monitors the off-load cellular service area and receives a page response message broadcast from said mobile telephone responsive to one of an off-load page broadcast from the off-load cellular system and a main page broadcast from the main cellular system, said receiver circuit output outputting said received page response message, and
  - said controller receives said page response message output from said receiver circuit, determines whether said page response message is responsive to said main page, and instructs the off-load cellular system to provide said off-load cellular service to said mobile telephone when said page response message is not responsive to said main page.

6. A control system according to claim 5, wherein when said controller determines that said page response message is responsive to said main page, said controller instructs the off-load cellular system to notify said mobile telephone to tune to the main cellular system, shedding said mobile telephone from the off-load cellular system.

7. An off-load cellular system for controlling cellular service between a main cellular system and the off-load cellular system, and for providing off-load cellular service to a mobile telephone, the main cellular system providing cellular service in at least one main cellular service area and the off-load cellular system providing off-load cellular service in an off-load cellular service area that is smaller than and within the at least one main cellular service area, the off-load cellular system comprising:
- a receiver circuit for monitoring the off-load cellular service area and receiving an origination message broadcast from the mobile telephone located in the off-load cellular service area, said receiver circuit having an output for outputting said received origination message;
- a system controller for receiving said origination message output from said receiver circuit and for outputting a connect signal indicating whether the off-load cellular service is to be provided to the mobile telephone responsive to said origination message;
- a connection controller for receiving said connect signal output from said system controller for transmitting to the mobile telephone a voice connect message indicating a frequency to obtain the off-load cellular service responsive to said connect signal, and for connecting the mobile telephone with a calling party when the system controller indicates that off-load cellular service is to be provided to the mobile telephone; and wherein said receiver circuit monitors the off-load cellular service area and receives a page response message broadcast from said mobile telephone responsive to one of an off-load page broadcast from the off-load cellular system and a main page broadcast from the main cellular system, said receiver circuit output outputting said received page response message, and wherein said system controller receives said page response message output from said receiver circuit, determines whether said page response message is responsive to said main page, and instructs the off-load cellular system to notify the mobile telephone to tune to the main cellular system when said system controller determines that said page response message is responsive to said main page, shedding said mobile telephone from the off-load cellular system.

8. A method for controlling cellular service between a main cellular system having at least one main cellular service area and an off-load cellular system having an off-load cellular service area that is smaller than and within the at least one main cellular service area, comprising the steps of:

(a) monitoring the off-load cellular service area and receiving an origination message broadcast from a mobile telephone located in the off-load cellular service area; and (b) instructing the off-load cellular system whether to provide off-load cellular service to the mobile telephone responsive to the origination message, wherein said instructing step (b) further comprises the step of preventing transient mobile telephones from being provided the off-load cellular service by requiring the mobile telephone to register with the off-load cellular system multiple times using the origination message.

9. A method for controlling cellular service between a main cellular system having at least one main cellular service area and an off-load cellular system having an off-load cellular service area that is smaller than and within the at least one main cellular service area, comprising the steps of:

(a) monitoring the off-load cellular service area and receiving an origination message broadcast from a mobile telephone located in the off-load cellular service area; and (b) instructing the off-load cellular system whether to provide off-load cellular service to the mobile telephone responsive to the origination message, wherein the origination message includes calling information, and said instructing step (b) further comprises the steps of:

(b1) determining whether the calling information is valid based upon predetermined criteria;

(b2) instructing the off-load cellular system to provide the off-load cellular service to the mobile telephone when the calling information is valid, and instructing the off-load cellular system not to provide the off-load cellular service and to notify the mobile telephone to tune to the main cellular system, shedding the mobile telephone from the off-load cellular system when the calling information is invalid.

10. A method for controlling cellular service between a main cellular system having at least one main cellular service area and an off-load cellular system having an off-load cellular service area that is smaller than and within the at least one main cellular service area, comprising the steps of:

(a) monitoring the off-load cellular service area and receiving an origination message broadcast from a mobile telephone located in the off-load cellular service area;

(b) instructing the off-load cellular system whether to provide off-load cellular service to the mobile telephone responsive to the origination message; and further comprising, before said monitoring step, the steps of (1) monitoring the off-load cellular service area and receiving a registration message broadcast from the mobile telephone, and (2) determining whether the mobile telephone is registered in the off-load cellular system responsive to the registration message, and preventing transient mobile telephones from registering by requiring the mobile telephone to attempt to register with the off-load cellular system multiple times before registering the mobile telephone.

11. A method for controlling cellular service between a main cellular system having at least one main cellular service area and an off-load cellular system having an off-load cellular service area that is smaller than and within the at least one main cellular service area, comprising the steps of:

(a) monitoring the off-load cellular service area and receiving an origination message broadcast from a mobile telephone located in the off-load cellular service area;

(b) instructing the off-load cellular system whether to provide off-load cellular service to the mobile telephone responsive to the origination message; and wherein said monitoring step (a) further comprises the step of monitoring the off-load cellular service area and receiving a page response message broadcast from the mobile telephone responsive to one of an off-load page broadcast from the off-load cellular system and a main page broadcast from the main cellular system, and said instructing step (b) further comprises the step of determining whether the page response message is responsive to the main page, and instructing the off-load cellular system to provide the off-load cellular service to the mobile telephone when the page response message is not responsive to the main page.

* * * * *